United States Patent
Liu et al.

(10) Patent No.: US 12,156,076 B2
(45) Date of Patent: Nov. 26, 2024

(54) MAPPING METHOD, NODE, COMMUNICATIONS APPARATUS, AND STORAGE MEDIUM

(71) Applicant: HUAWEI TECHNOLOGIES CO., LTD., Guangdong (CN)

(72) Inventors: Jing Liu, Shanghai (CN); Mingzeng Dai, Shenzhen (CN); Zhenzhen Cao, Beijing (CN); Yuanping Zhu, Shanghai (CN); Yibin Zhuo, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 430 days.

(21) Appl. No.: 17/401,669

(22) Filed: Aug. 13, 2021

(65) Prior Publication Data

US 2021/0377805 A1    Dec. 2, 2021

Related U.S. Application Data

(63) Continuation of application No. PCT/CN2019/079375, filed on Mar. 22, 2019.

(30) Foreign Application Priority Data

Feb. 15, 2019 (CN) .......................... 201910117832.4

(51) Int. Cl.
*H04W 28/12* (2009.01)
*H04W 72/21* (2023.01)
(Continued)

(52) U.S. Cl.
CPC ........... *H04W 28/12* (2013.01); *H04W 72/21* (2023.01); *H04W 84/047* (2013.01); *H04W 92/20* (2013.01)

(58) Field of Classification Search
CPC ... H04W 28/12; H04W 72/21; H04W 84/047; H04W 92/20
See application file for complete search history.

(56) References Cited

U.S. PATENT DOCUMENTS 9,210,728 B2    12/2015    Koodli et al.
2016/0381695 A1    12/2016    Zhang et al.
(Continued)

FOREIGN PATENT DOCUMENTS

CN    1536900 A    10/2004
CN    104662829 A    5/2015
(Continued)

OTHER PUBLICATIONS

Samsung, "F1AP mapping options for IAB", 3GPP TSG_RAN WG3 Meeting #101 R3-184842, Aug. 2018 (Year: 2018).*
(Continued)

*Primary Examiner* — Siming Liu
(74) *Attorney, Agent, or Firm* — Fish & Richardson P.C.

(57) ABSTRACT

Example mapping methods and apparatus are described. One example method includes determining a message type of an uplink signaling message by an integrated access and backhaul node. The integrated access and backhaul node maps the uplink signaling message to a corresponding backhaul radio link control (BH RLC) based on an uplink mapping relationship from an integrated access and backhaul donor centralized unit and the message type. The uplink signaling message is sent to a parent node of the integrated access and backhaul node.

10 Claims, 17 Drawing Sheets

(51) Int. Cl.
*H04W 84/04* (2009.01)
*H04W 92/20* (2009.01)

(56) References Cited

U.S. PATENT DOCUMENTS

| | | | |
|---|---|---|---|
| 2018/0049190 | A1 | 2/2018 | Abedini et al. |
| 2018/0092139 | A1 | 3/2018 | Novlan et al. |
| 2018/0205808 | A1 | 7/2018 | Yang et al. |
| 2018/0368204 | A1 | 12/2018 | Park et al. |

FOREIGN PATENT DOCUMENTS

| | | |
|---|---|---|
| CN | 105323044 A | 2/2016 |
| CN | 107426776 A | 12/2017 |
| CN | 107852363 A | 3/2018 |
| CN | 107872876 A | 4/2018 |
| CN | 108616988 A | 10/2018 |
| CN | 108668381 A | 10/2018 |
| IN | 108370593 A | 8/2018 |
| WO | 2010028311 A1 | 3/2010 |

OTHER PUBLICATIONS

Huawei, HiSilicon, "SRB types for Control Plane Alternative 2", 3GPP TSG-RAN WG2 #104, R2-1818277, Nov. 2018 (Year: 2018).*
Huawei, HiSilicon, "IAB bearer mapping decisions", 3GPP TSG-RAN WG2#104, R2-1817906, Nov. 2018 (Year: 2018).*
Office Action issued in Indian Application No. 202137037710 on Jul. 12, 2022, 7 pages.
Qualcomm Incorporated (Rapporteur), "Securing F1*-U in IAB architecture 1a," 3GPP TSG-RAN WG2 Meeting #104, R2-1818516, Spokane, WA, USA, Nov. 12-16, 2018, 5 pages.
Ericsson, "Mapping of CP data over backhaul links in IAB Architecture group 1a," 3GPP TSG RAN WG3 #102, R3-186738, Spokane, WA, USA, Nov. 12-16, 2018, 5 pages.
Office Action in Chinese Appln. No. 202110877597.8, dated May 13, 2023, 10 pages.
Office Action in Japanese Appln. No. 2021-547464, dated May 16, 2023, 6 pages (with English translation).
Office Action in Chinese Appln. No. 201910117832.4, dated Mar. 18, 2023, 13 pages.
Huawei, "Bearer Mapping in Donor-DU and IAB node," 3GPP TSG-RAN WG3 Meeting #103 R3-190500, Athens, Feb. 25-Mar. 1, 2018, 3 pages.
CATT, "NR Physical Layer design for IAB backhaul link," 3GPP TSG RAN WG1 Meeting #93 R1-1806321, Busan, Korea, May 21-25, 2018, 5 pages.
PCT International Search Report and Written Opinion issued in International Application No. PCT/CN2019/079375 on Nov. 13, 2019, 12 pages (partial English translation).
CATT, "Unified design and QoS Handling for IAB," 3GPP TSG-RAN WG2 Meeting #103bis, R2-1816885, Spokane, USA, Nov. 12-16, 2018, 5 pages.
Extended European Search Report issued in European Application No. 19915437.8 on Mar. 10, 2022, 10 pages.
Huawei et al., "IAB bearer mapping decisions, "3GPP TSG-RAN WG2 #104, R2-1817906, Spokane, USA, Nov. 12-16, 2018, 7 pages.
Huawei et al., "SRB Types for Control Plane Alternative 2," 3GPP TSG-RAN WG2 #104, R2-1818277, Spokane, USA, Nov. 12-16, 2018, 6 pages.
Samsung, "F1AP mapping options for IAB," 3GPP TSG-RAN WG3 Meeting #101, R3-184842, Gothenburg, Sweden, Aug. 20-24, 2018, 4 pages.
Huawei, HiSilicon, "SRB Types for Control Plane Alternative 2," 3GPP TSG-RAN WG3 #102, R3-186565, Spokane, US, Nov. 12-16, 2018, 5 pages.

Office Action issued in Chinese Application No. 201980091057.8 on Jun. 28, 2022, 6 pages.
3GPP TS 38.473 V15.4.1, "3rd Generation Partnership Project; Technical Specification Group Radio Access Network; NG-RAN;F1 application protocol (F1 Ap) (Release 15)," Jan. 2019, 192 pages.
3GPP TS 38.470 V15.4.0, "3rd Generation Partnership Project; Technical Specification Group Radio Access Network; NG-RAN; F1 general aspects and principles (Release 15)," Dec. 2018, 13 pages.
3GPP TS 38.423 V15.2.0, "3rd Generation Partnership Project; Technical Specification Group Radio Access Network; NG-RAN; Xn application protocol (XnAP) (Release 15)," Dec. 2018, 281 pages.
3GPP TS 38.413 V15.2.0, "3rd Generation Partnership Project; Technical Specification Group Radio Access Network; NG-RAN; NG Application Protocol (NGAP) (Release 15)," Dec. 2018, 308 pages.
3GPP TS 38.401 V15.4.0, "3rd Generation Partnership Project; Technical Specification Group Radio Access Network; NG-RAN; Architecture description (Release 15)," Dec. 2018, 40 pages.
3GPP TS 38.331 V15.4.0, "3rd Generation Partnership Project; Technical Specification Group Radio Access Network; NR; Radio Resource Control (RRC) protocol specification (Release 15)," Dec. 2018, 474 pages.
3GPP TS 38.321 V15.4.0, "3rd Generation Partnership Project; Technical Specification Group Radio Access Network; NR; Medium Access Control (MAC) protocol specification (Release 15)," Dec. 2018, 77 pages.
3GPP TS 38.304 V15.2.0, "3rd Generation Partnership Project; Technical Specification Group Radio Access Network; NR; User Equipment (UE) procedures in Idle mode and RRC Inactive state (Release 15)," Dec. 2018, 28 pages.
3GPP TS 38.300 V15.4.0, "3rd Generation Partnership Project; Technical Specification Group Radio Access Network; NR; NR and NG-RAN Overall Description; Stage 2 (Release 15)," Dec. 2018, 97 pages.
3GPP TS 37.340 V15.4.0, "3rd Generation Partnership Project; Technical Specification Group Radio Access Network; Evolved Universal Terrestrial Radio Access (E-UTRA) and NR; Multi-connectivity; Stage 2 (Release 15)," Dec. 2018, 67 pages.
3GPP TS 36.423 V15.4.0, "3rd Generation Partnership Project; Technical Specification Group Radio Access Network; Evolved Universal Terrestrial Radio Access Network (E-UTRAN); X2 application protocol (X2AP) (Release 15)," Dec. 2018, 408 pages.
3GPP TS 36.413 V15.4.0, "3rd Generation Partnership Project; Technical Specification Group Radio Access Network; Evolved Universal Terrestrial Radio Access Network (E-UTRAN); S1 Application Protocol (S1AP) (Release 15)," Dec. 2018, 383 pages.
3GPP TS 36.331 V14.9.0, "3rd Generation Partnership Project; Technical Specification Group Radio Access Network; Evolved Universal Terrestrial Radio Access (E-UTRA); Radio Resource Control (RRC); Protocol specification (Release 14)," Dec. 2018, 773 pages.
3GPP TS 36.304 V15.2.0, "3rd Generation Partnership Project; Technical Specification Group Radio Access Network; Evolved Universal Terrestrial Radio Access (E-UTRA); User Equipment (UE) procedures in idle mode (Release 15)," Dec. 2018, 55 pages.
Nokia, Nokia Shanghai Bell, "Adaptation Layer Modelling and Configuration," 3GPP TSG-RAN WG2 Meeting #106, R2-1907186, Reno, USA, May 13-17, 2019, 3 pages.
Office Action issued in Japanese Application No. 2021-547464 on Nov. 1, 2022, 8 pages (with English translation).
Samsung, "F1AP Mapping Options for IAB," 3GPP TSG-RAN WG3 Meeting #101bis, R3-185732, Chengdu, China, Oct. 8-12, 2018, 4 pages.
ZTE, "Latency Analysis for IAB Network," 3GPP TSG-RAN WG2 #103bis, R2-1814722, Chengdu, China, Oct. 8-12, 2018, 5 pages.

* cited by examiner

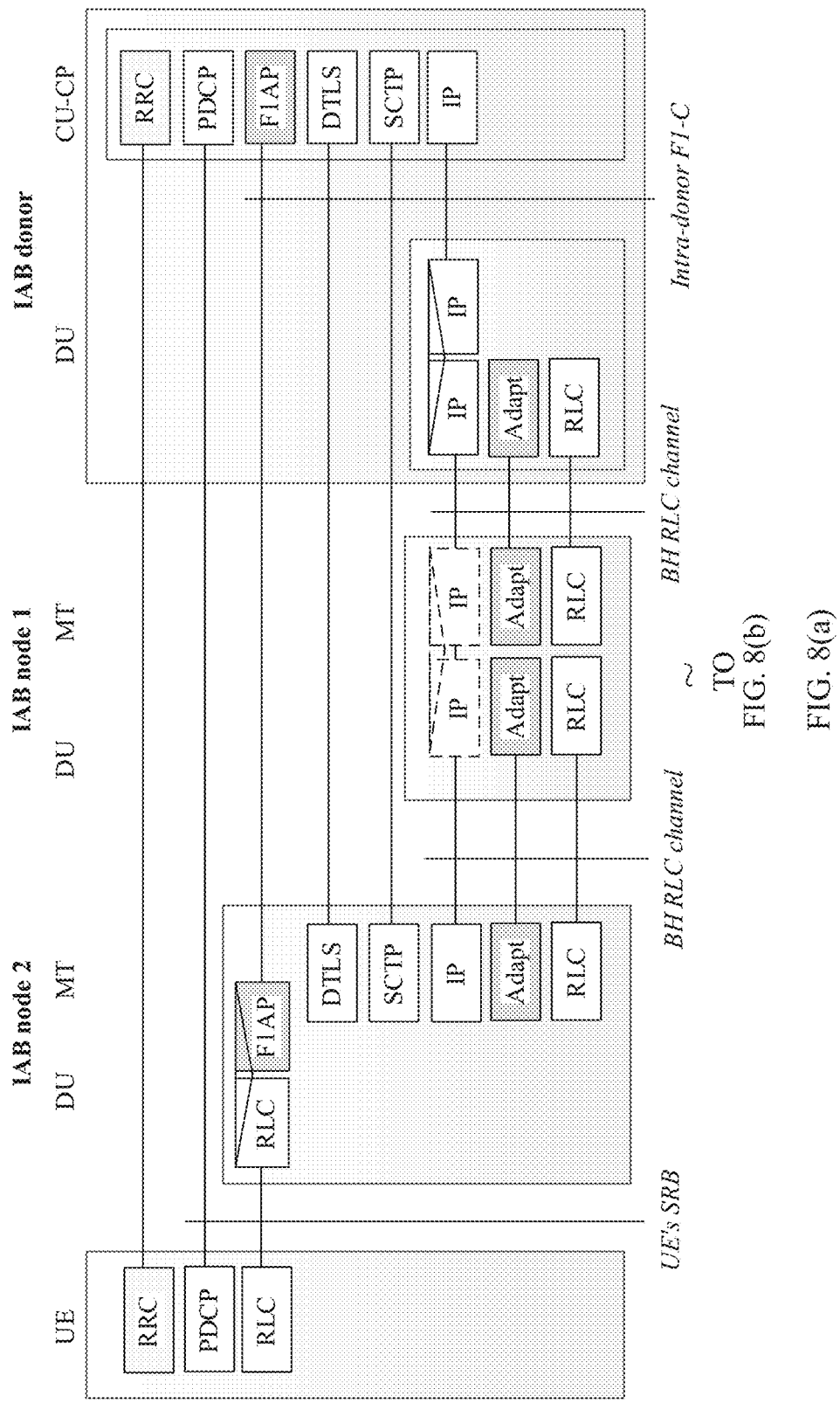

MAPPING METHOD, NODE, COMMUNICATIONS APPARATUS, AND STORAGE MEDIUM

CROSS-REFERENCE TO RELATED APPLICATIONS

This application is a continuation of International Application No. PCT/CN2019/079375, filed on Mar. 22, 2019, which claims priority to Chinese Patent Application No. 201910117832.4, filed on Feb. 15, 2019. The disclosures of the aforementioned applications are hereby incorporated by reference in their entireties.

TECHNICAL FIELD

The present disclosure relates to the field of communications technologies, and specifically, to a mapping method, a node, a communications apparatus, and a storage medium.

BACKGROUND

An integrated access and backhaul (IAB) technology is an important part of a 5th generation (5G) mobile communications technology. An integrated access and backhaul donor (IAB donor) accesses a 5G core 5GC by using an NG interface, and an integrated access and backhaul node (IAB node) accesses the IAB donor by using an Un interface, so that a signal transmission link is formed. User equipment (UE) needs only to access the IAB node, and then may access a 5G network. It should be noted that an interface between the IAB donor and the IAB node may be referred to as a Un interface, or may be referred to as another interface. This is not limited. In this patent, the Un interface is used as an example for description.

Based on the foregoing architecture, two network elements: the IAB node and the IAB donor need to be passed through in sequence during signaling exchange between the UE and a network side. In a multi-hop data backhaul scenario, a plurality of IAB nodes need to be passed through. For example, in a two-hop data backhaul scenario, signaling sent by UE needs to pass through an IAB node 2, an IAB node 1, and an IAB donor. The IAB node 2 and the IAB node 1 are connected to each other by using a Un 2 interface, and the IAB node 1 and the IAB donor are connected to each other by using a Un 1 interface. A link between the IAB node 2 and the IAB node 1 and a link between the IAB node 1 and the IAB donor are collectively referred to as a backhaul link. A link between the UE and the IAB node 2 is referred to as an access link.

In a current technology, a plurality of types of signaling messages need to be transmitted on a backhaul link, including an RRC (Radio Resource Control) message, an F1AP message, and the like. Different signaling messages have different priorities. For example, the F1 application protocol (F1AP) message may be classified into a UE-associated F1AP message and a non-UE-associated F1AP message. The UE-associated F1AP message is mainly used for UE context management, RRC message transmission, and the like of an F1 interface. The non-UE-associated F1AP message is mainly used for management of an F1 interface, such as setup, reset, and configuration update of the F1 interface. Therefore, a transmission priority of the non-UE-associated F1AP message is usually higher than that of the UE-associated F1AP message. For another example, for an RRC message, an RRC message carried on an SRB 0 has the highest transmission priority, and a transmission priority of an RRC message carried on an SRB 1 is higher than that of an RRC message carried on an SRB 2.

In the current technology, the backhaul link supports transmission of a plurality of types of signaling. However, bearer mapping manners of the plurality of types of signaling on the backhaul link have not been discussed. If signaling types are not distinguished on the backhaul link, low-priority signaling may be processed before high-priority signaling. Consequently, an error occurs on the link, resulting in impact on network performance.

Therefore, the foregoing problem in the current technology remains to be resolved.

SUMMARY

Embodiments of the present disclosure provide a mapping method, a node, a communications apparatus, and a storage medium, to respectively map different types of signaling messages to different signaling transmission channels on a backhaul link for transmission, so that a signaling message having a higher priority is distinguished in a signaling transmission process, thereby ensuring that the signaling message having the higher priority can be preferentially transmitted.

In view of this, according to a first aspect of this application, a mapping method is provided. The method includes: An integrated access and backhaul donor distributed unit IAB donor DU receives a signaling message and first indication information from an integrated access and backhaul donor centralized unit IAB donor CU, where the first indication information is used to indicate a signaling type of the signaling message. The IAB donor DU maps, based on the signaling type of the signaling message, the signaling message to a transmission channel corresponding to the signaling message, and sends the signaling message to an integrated access and backhaul node IAB node. For example, the signaling type includes an F1AP message related to an access terminal or an F1AP message unrelated to the access terminal. The first indication information may be carried in an information element (IE). The F1AP message related to the access terminal may be an F1AP message related to user equipment, namely, a UE-associated F1AP message, and the F1AP message unrelated to the access terminal may be an F1AP message unrelated to the user equipment, namely, a non-UE-associated F1AP message.

In this embodiment, the IAB donor DU maps signaling messages of different signaling types to corresponding transmission channels based on an indication of the first indication information, and sends the signaling messages to the IAB node. Because the signaling messages of different signaling types are mapped to different transmission channels, the signaling messages of different signaling types can be distinguished based on the transmission channels between the IAB node and the IAB donor DU. For example, when a signal is weak, a signaling message transmitted on a transmission channel having a higher priority is preferentially transmitted, thereby improving signal transmission reliability.

With reference to the first aspect, in a first possible implementation, the method further includes:

The IAB donor DU receives second indication information sent by the IAB donor CU, where the second indication information is used to: when the signaling type of the signaling message is the F1AP message related to the access terminal, indicate an SRB bearer type corresponding to an RRC message carried in the F1AP message related to the access terminal. For example, the SRB bearer type is any one of an SRB 0, an SRB 1, or an SRB 2. A priority of the SRB bearer type is as follows: A priority of the SRB 2 is higher than a priority of the SRB 1, and the priority of the SRB 1 is higher than a priority of the SRB 0. For example, the second indication information may be an independent IE, and the RRC message may be an RRC message sent by the IAB donor CU to the user equipment UE, or may be an RRC message sent by the IAB donor CU to the IAB node.

In this embodiment, the IAB donor DU separately receives the first indication information and the second indication information from the IAB donor CU. For example, the first indication information and the second indication information are respectively carried in two IEs. The second indication information is used to indicate that the SRB bearer type corresponding to the RRC message carried in the F1AP message related to the access terminal is any one of the SRB 0, the SRB 1, or the SRB 2. Because three transmission channels SRB 0, SRB 1, and SRB 2 have different transmission priorities, a second indication information is used to distinguish SRB bearer types corresponding to RRC messages carried in F1AP messages related to the access terminal. When all the signaling messages are the F1AP messages related to the access terminal, priorities of the signaling messages may be further distinguished based on the SRB bearer types corresponding to the carried RRC messages, so that a priority screening granularity is fined.

With reference to the first aspect, in a second possible implementation, the first indication information is further used to indicate an SRB bearer type corresponding to an RRC message carried in the F1AP message related to the access terminal. For example, the SRB bearer type is any one of an SRB 0, an SRB 1, or an SRB 2. For example, the RRC message may be an RRC message sent by the IAB donor CU to the user equipment UE, or may be an RRC message sent by the IAB donor CU to the IAB node.

In this embodiment, the IAB donor DU receives only first indication information from the IAB donor CU. The first indication information is carried in one IE, and is used to: indicate signaling types of signaling messages, and indicate SRB bearer types corresponding to carried RRC messages when the signaling types of the signaling messages are F1AP messages related to the access terminal. In this way, when all the signaling messages are the F1AP messages related to the access terminal, by using only one piece of first indication information, priorities of the signaling messages may be further distinguished based on the SRB bearer types corresponding to the carried RRC messages, so that a priority screening granularity is fined.

With reference to the first or second possible implementation of the first aspect, in a third possible implementation, that IAB donor DU maps, based on the signaling type of the signaling message, the signaling message to a transmission channel corresponding to the signaling message, and sends the signaling message to an IAB node includes: If the signaling type of the signaling message is the F1AP message related to the access terminal, the IAB donor DU sends, to the IAB node through a first transmission channel, the F1AP message related to the access terminal, where the first transmission channel is an SRB x or a radio link control channel RLC channel x, and x is not 0, 1, 2, or 3; or if the signaling type of the signaling message is the F1AP message unrelated to the access terminal, the IAB donor DU sends, to the IAB node through a second transmission channel, the F1AP message unrelated to the access terminal, where the second transmission channel is an SRB y or an RLC channel y, and y is not 0, 1, 2, 3, or x.

In this embodiment, for two types of messages the F1AP message related to the access terminal and the F1AP message unrelated to the access terminal, the IAB donor DU respectively sends the two types of messages through different transmission channels, so that a specific sending implementation is fined.

With reference to any one of the first aspect or the first to third possible implementations of the first aspect, in a fourth possible implementation, if the signaling type of the signaling message is the F1AP message related to the access terminal, that IAB donor DU maps, based on the signaling type of the signaling message, the signaling message to a transmission channel corresponding to the signaling message, and sends the signaling message to an IAB node includes: If the SRB bearer type corresponding to the RRC message carried in the F1AP message related to the access terminal is the SRB 0, the IAB donor DU maps the F1AP message related to the access terminal to a third transmission channel, and sends the F1AP message related to the access terminal to the IAB node, where the third transmission channel is an SRB z or a radio link control channel RLC channel z, and z is not 0, 1, 2, 3, x, or y; or if the SRB bearer type corresponding to the RRC message carried in the F1AP message related to the access terminal is the SRB 1, the IAB donor DU maps the F1AP message related to the access terminal to a fourth transmission channel, and sends the F1AP message related to the access terminal to the IAB node, where the fourth transmission channel is an SRB m or a radio link control channel RLC channel m, and m is not 0, 1, 2, 3, x, y, or z; or if the SRB bearer type corresponding to the RRC message carried in the F1AP message related to the access terminal is the SRB 2, the IAB donor DU maps the F1AP message related to the access terminal to a fifth transmission channel, and sends the F1AP message related to the access terminal to the IAB node, where the fifth transmission channel is an SRB n or a radio link control channel RLC channel n, and n is not 0, 1, 2, 3, x, y, z, or m.

In this embodiment, for F1AP messages that are also related to the access terminal, if sending priorities of signaling messages need to be further distinguished, priorities of RRC messages carried in the F1AP messages related to the access terminal may be distinguished, so that the F1AP messages related to the access terminal that carry different RRC messages are respectively sent to corresponding transmission channels. In this way, at a finer priority granularity, different sending channels are used for sending, to distinguish messages having different priorities.

With reference to any one of the first aspect or the first to third possible implementations of the first aspect, in a fifth possible implementation, the first indication information is carried in an F1AP message, where a PDCP layer may be used for security protection of the F1AP message.

In this embodiment, the first indication information is carried in the F1AP message. This complies with an alternative 2 architecture in 3GPP R15.

With reference to any one of the first aspect or the first to third possible implementations of the first aspect, in a sixth possible implementation, the first indication information is carried in a differentiated services code point DSCP field or a flow label field in an IP header field, where DTLS may be used for security protection of the signaling message.

In this embodiment, the first indication information is carried in the differentiated services code point DSCP field or the flow label field in the IP header field and sent to the IAB node by using an IP route. This complies with an alternative 4 architecture in 3GPP R15.

With reference to any one of the first aspect or the first to sixth possible implementations of the first aspect, in a seventh possible implementation, before the IAB donor DU receives the signaling message and the first indication information that are sent by the IAB donor CU, the method further includes: The IAB donor DU establishes a transmission channel that corresponds to the signaling type of the signaling message and that is between the IAB node and the IAB donor DU.

In this embodiment, before signal transmission starts, the IAB donor DU needs to establish the transmission channel that corresponds to the signaling type of the signaling message and that is between the IAB node and the IAB donor DU, where the transmission channel may be a newly defined SRB or an RLC channel, to perform a subsequent sending step.

According to a second aspect of this application, a mapping method is provided. The method includes: An integrated access and backhaul donor centralized unit IAB donor CU sends a signaling message and first indication information to an integrated access and backhaul donor distributed unit IAB donor DU, where the first indication information is used to indicate a signaling type of the signaling message. For example, the signaling type includes an F1AP message related to an access terminal or an F1AP message unrelated to the access terminal. The first indication information may be carried in an information element (IE). The F1AP message related to the access terminal may be an F1AP message related to user equipment, namely, a UE-associated F1AP message, and the F1AP message unrelated to the access terminal may be an F1AP message unrelated to the user equipment, namely, a non-UE-associated F1AP message.

In this embodiment, the IAB donor CU sends the first indication information while sending the signaling message to the IAB donor DU, where the first indication information is used to indicate that the signaling type of the signaling message is the UE-associated F1AP message or the non-UE-associated F1AP message, so that the IAB donor DU can know, based on the first indication information, a signaling type of the received signaling message. In this way, the IAB donor DU can map signaling messages of different signaling types to corresponding transmission channels, and send the signaling messages to an IAB node. Because the signaling messages of different signaling types are mapped to different transmission channels, the signaling messages of different signaling types can be distinguished based on the transmission channels between the IAB node and the IAB donor DU. For example, when a signal is weak, a signaling message transmitted on a transmission channel having a higher priority is preferentially transmitted, thereby improving signal transmission reliability.

With reference to the second aspect, in a first possible implementation, the method further includes: The IAB donor CU sends second indication information to the IAB donor DU, where the second indication information is used to: when the signaling type of the signaling message is the F1AP message related to the access terminal, indicate an SRB bearer type corresponding to an RRC message carried in the F1AP message related to the access terminal. For example, the SRB bearer type is any one of an SRB 0, an SRB 1, or an SRB 2. The second indication information may be an independent IE, and the RRC message may be an RRC message sent by the IAB donor CU to the user equipment UE, or may be an RRC message sent by the IAB donor CU to the IAB node.

In this embodiment, the IAB donor CU separately sends the first indication information and the second indication information to the IAB donor DU. For example, the first indication information and the second indication information are respectively carried in two IEs. The second indication information is used to indicate that the SRB bearer type corresponding to the RRC message carried in the F1AP message related to the access terminal is any one of the SRB 0, the SRB 1, or the SRB 2. A priority of the SRB bearer type is as follows: A priority of the SRB 2 is higher than a priority of the SRB 1, and the priority of the SRB 1 is higher than a priority of the SRB 0. Because three transmission channels SRB 0, SRB 1, and SRB 2 have different transmission priorities, a second indication message is used to distinguish SRB bearer types corresponding to RRC messages carried in F1AP messages related to the access terminal. When all the signaling messages are the F1AP messages related to the access terminal, priorities of the signaling messages may be further distinguished based on the SRB bearer types corresponding to the carried RRC messages, so that a priority screening granularity is fined.

With reference to the second aspect, in a second possible implementation, the first indication information is further used to indicate an SRB bearer type corresponding to an RRC message carried in the F1AP message related to the access terminal. For example, the SRB bearer type is any one of an SRB 0, an SRB 1, or an SRB 2. The RRC message may be an RRC message sent by the IAB donor CU to the user equipment UE, or may be an RRC message sent by the IAB donor CU to the IAB node.

In this embodiment, the IAB donor CU sends only one piece of first indication information to the IAB donor DU. The first indication information is carried in one IE, and is used to: indicate signaling types of signaling messages, and indicate SRB bearer types corresponding to carried RRC messages when the signaling types of the signaling messages are F1AP messages related to the access terminal. In this way, when all the signaling messages are the F1AP messages related to the access terminal, by using only one piece of first indication information, priorities of the signaling messages may be further distinguished based on the SRB bearer types corresponding to the carried RRC messages, so that a priority screening granularity is fined.

With reference to any one of the second aspect or the first to second possible implementations of the second aspect, in a third possible implementation, the first indication information is carried in an F1AP message; or the first indication information is carried in a differentiated services code point DSCP field or a flow label field in an IP header field.

In this embodiment, the first indication information is carried in the F1AP message. This complies with an alternative 2 architecture in 3GPP R15. The first indication information is carried in the differentiated services code point DSCP field or the flow label field in the IP header field and sent to the IAB node by using an IP route. This complies with an alternative 4 architecture in 3GPP R15.

With reference to the third possible implementation of the second aspect, in a fourth possible implementation, the first indication information is carried in the differentiated services code point DSCP field or the flow label field in the IP header field, and that an IAB donor CU sends a signaling message and first indication information to an IAB donor DU includes: The IAB donor CU sends an identifier corresponding to a transmission channel between the IAB donor DU and the IAB node and the DSCP or the flow label value to the IAB donor DU, for example, the DSCP or the flow label value is in a one-to-one correspondence with the identifier corresponding to the transmission channel. Alternatively, the IAB donor CU sends the signaling type of the signaling message and the DSCP or the flow label value to the IAB donor DU, for example, the type of the signaling message is in a one-to-one correspondence with the DSCP or the flow label value.

In this embodiment, the first indication information is carried in the DSCP field or the flow label field in the IP header field.

With reference to any one of the second aspect or the first to fourth possible implementations of the second aspect, in a fifth possible implementation, before the IAB donor CU sends the signaling message and the first indication information to the IAB donor DU, the method further includes: The IAB donor CU indicates the IAB donor DU to establish a transmission channel that corresponds to the signaling type of the signaling message and that is between the IAB node and the IAB donor DU, where the transmission channel may be a newly defined SRB or an RLC channel, to perform a subsequent sending step.

According to a third aspect of this application, a mapping method is provided. The method includes: An integrated access and backhaul node IAB node receives a signaling message sent by a first node, where the first node may be an upper-level node of the IAB node, or may be a lower-level node of the IAB node. The IAB node maps the signaling message to a transmission channel corresponding to the signaling message, and sends the signaling message to a second node. When the first node is an upper-level node of the IAB node, the second node is a lower-level node of the IAB node; or when the first node is a lower-level node of the IAB node, the second node is an upper-level node of the IAB node. A signaling type includes an F1AP message related to an access terminal or an F1AP message unrelated to the access terminal. The F1AP message related to the access terminal may be an F1AP message related to user equipment, namely, a UE-associated F1AP message, and the F1AP message unrelated to the access terminal may be an F1AP message unrelated to the user equipment, namely, a non-UE-associated F1AP message.

In this embodiment, an IAB node is used for signaling transmission between user equipment UE and an integrated access and backhaul donor distributed unit IAB donor DU. There may be one or more IAB nodes. One IAB node indicates a one-hop data backhaul scenario. A plurality of IAB nodes indicate a multi-hop backhaul scenario. In the multi-hop backhaul scenario, signaling needs to be transmitted between the plurality of IAB nodes one by one until the signaling arrives at the UE. During message sending, the IAB node maps signaling messages to corresponding transmission channels based on types of the signaling messages, so that the IAB node can distinguish the signaling messages of the different signaling types based on the transmission channels during signal sending. For example, when a signal is weak, a signaling message transmitted on a transmission channel having a higher priority is preferentially transmitted, thereby improving signal transmission reliability.

With reference to the third aspect, in a first possible implementation, the method further includes: The IAB node obtains an identifier corresponding to the transmission channel that corresponds to the signaling message sent by the first node, where the identifier corresponding to the transmission channel may be a logical channel identifier, namely, an LCID or an LCH ID. The IAB node determines, based on the identifier corresponding to the transmission channel, the transmission channel corresponding to the signaling message.

In this embodiment, the IAB node does not know the signaling type of the signaling message, but obtains only the identifier sent by the first node, maps the received signaling message to the transmission channel corresponding to the identifier, and sends the signaling message to the second node.

With reference to the third aspect, in a second possible implementation, the method further includes: The IAB node obtains, from an adaptation layer, the signaling type corresponding to the signaling message, where the adaptation layer is a protocol layer between the IAB node and the first node.

In this embodiment, the IAB node obtains, through the adaptation layer, the signaling type corresponding to the signaling message, maps the signaling message to the corresponding transmission channel based on the signaling type, and sends the signaling message to the second node.

It should be noted that, in all embodiments of the present disclosure, the adaptation layer may be an independent protocol layer, or may be a sublayer or a sub-module of an existing protocol layer, for example, a sublayer of an RLC layer or a sublayer of a MAC layer. This is not limited in the embodiments of this application. It should be further understood that the adaptation layer may have another name. This is not limited in the embodiments of this application. Alternatively, the adaptation layer is deployed above the RLC layer, or may be deployed below the RLC layer. This is not limited in the embodiments of this application.

With reference to the third aspect, in a third possible implementation, the IAB node includes an IAB node distributed unit DU and an IAB node mobile terminal unit MT. The method further includes: The IAB node MT obtains, from the IAB node DU, the signaling type corresponding to the signaling message. Alternatively, the IAB node MT obtains, from an upper-layer protocol stack of the IAB node MT, the signaling type corresponding to the signaling message.

In this embodiment, the IAB node may include two network elements: the IAB node DU and the IAB node MT. In two different manners, the signaling message is mapped to the corresponding transmission channel and sent to the second node.

With reference to the third aspect, in a fourth possible implementation, the method further includes: The IAB node receives indication information from the first node, where the indication information is used to: when the signaling type of the signaling message is the F1AP message related to the access terminal, indicate an SRB bearer type corresponding to an RRC message carried in the F1AP message related to the access terminal, and the SRB bearer type is any one of an SRB 0, an SRB 1, or an SRB 2. That the IAB node maps the signaling message to a transmission channel corresponding to the signaling message, and sends the signaling message to a second node includes: The IAB node maps, based on the indication information, the signaling message to the transmission channel corresponding to the signaling message, and sends the signaling message to the second node.

In this embodiment, the indication information is used to further distinguish, based on SRB bearer types corresponding to RRC messages carried in F1AP messages related to the access terminal, priorities of the F1AP messages related to the access terminal, thereby further improving a priority distinguishment granularity.

According to a fourth aspect of this application, a mapping method is provided. The method includes: An integrated access and backhaul node IAB node determines a signaling type of a to-be-sent uplink signaling message, where the IAB node is an access node of a terminal device. The IAB node maps, based on an uplink mapping relationship obtained from an integrated access and backhaul donor centralized unit IAB donor CU, the to-be-sent uplink signaling message to a corresponding transmission channel, and sends the to-be-sent uplink signaling message to a parent node of the IAB node.

In this embodiment, the integrated access and backhaul node IAB node is a node connected to user equipment UE. The IAB node maps, based on the uplink mapping relationship obtained from the integrated access and backhaul donor centralized unit IAB donor CU, the to-be-sent uplink signaling message to the corresponding transmission channel, and sends the to-be-sent uplink signaling message to the parent node of the IAB node. In this way, starting from the access node, priorities of different signaling messages may be distinguished.

With reference to the fourth aspect, in a first possible implementation, the uplink mapping relationship is one or more of the following: a first mapping relationship between an SRB bearer type and a transmission channel; a first mapping relationship between a terminal device identifier UE ID and an SRB bearer type corresponding to the UE ID and a transmission channel; a first mapping relationship between a logical channel identifier LCID on a Uu interface and a transmission channel; a first mapping relationship between a UE ID and an LCID on a Uu interface corresponding to the UE ID and a transmission channel; a first mapping relationship between a terminal device bearer identifier UE bearer ID and a transmission channel; a first mapping relationship between a UE ID and a UE bearer ID corresponding to the UE ID and a transmission channel; a first mapping relationship between different signaling types and a transmission channel; or a first mapping relationship between a UE ID and different signaling types corresponding to the UE ID and a transmission channel, where the SRB bearer type is an SRB 0, an SRB 1, an SRB 2, or an SRB 3 on the Uu interface; the LCID on the Uu interface is an LCID on an interface between the IAB node and the terminal device; the transmission channel is a transmission channel between the IAB node and the parent node of the IAB node; the different signaling types include an F1AP message related to an access terminal and an F1AP message unrelated to the access terminal; and the UE ID is a unique identifier of a terminal device that accesses an access IAB node.

In this embodiment, based on different first mapping relationships, the priorities of the signaling messages can be distinguished from different perspectives in an alternative 2 architecture.

With reference to the first possible implementation of the fourth aspect, in a second possible implementation, the transmission channel is a BH RLC channel, and the transmission channel is identified by using a logical channel identifier LCID corresponding to the BH RLC channel.

In this embodiment, the transmission channel may be specifically the BH RLC channel, to implement signaling message transmission.

With reference to the fourth aspect, in a third possible implementation, the uplink mapping relationship is at least one of the following: a second mapping relationship between an SRB bearer type and a differentiated services code point DSCP or a flow label value; a second mapping relationship between a UE ID and an SRB bearer type corresponding to the UE ID and a differentiated services code point DSCP/flow label value; a second mapping relationship between an LCID on a Uu interface and a DSCP/ flow label value; a second mapping relationship between a UE ID and an LCID on a Uu interface corresponding to the UE ID and a DSCP/flow label value; a second mapping relationship between a user equipment bearer identifier UE bearer ID and a DSCP/flow label value; a second mapping relationship between a UE ID and a UE bearer ID corresponding to the UE ID and a DSCP/flow label value; a second mapping relationship between different signaling types and a DSCP/flow label value; or a second mapping relationship between a UE ID and different signaling types corresponding to the UE ID and a DSCP/flow label value, where the SRB bearer type is an SRB 0, an SRB 1, an SRB 2, or an SRB 3 on the Uu interface; the LCID on the Uu interface is an LCID on an interface between the IAB node and the terminal device; the different signaling types include an F1AP message related to an access terminal and an F1AP message unrelated to the access terminal; and the UE ID is a unique identifier of a terminal device that accesses an access IAB node.

In this embodiment, based on different second mapping relationships, the priorities of the signaling messages can be distinguished from different perspectives in an alternative 4 architecture.

With reference to the third possible implementation of the fourth aspect, in a fourth possible implementation, before the IAB node maps, based on the uplink mapping relationship obtained from the IAB donor CU, the to-be-sent uplink signaling message to the corresponding transmission channel, and sends the to-be-sent uplink signaling message to the parent node of the IAB node, the method further includes: The IAB node obtains a third mapping relationship between a DSCP/flow label and a BH RLC channel from the IAB donor CU, where the BH RLC channel is a BH RLC channel between the IAB node and the parent node of the IAB node.

In this embodiment, because the priorities of the signaling messages need to be distinguished by using the DSCP/flow label in the alternative 4 architecture, the IAB node needs to obtain the third mapping relationship in advance.

With reference to the fourth possible implementation of the fourth aspect, in a fifth possible implementation, that the IAB node maps, based on an uplink mapping relationship obtained from an IAB donor CU, the to-be-sent uplink signaling message to a corresponding transmission channel, and sends the to-be-sent uplink signaling message to a parent node of the IAB node includes: The IAB node adds a corresponding DSCP/flow label value to an IP layer header field of the to-be-sent uplink signaling message based on the second mapping relationship. The IAB node maps, based on the third mapping relationship, the uplink signaling message whose IP layer header field includes the DSCP/flow label value to the corresponding BH RLC channel, and sends the uplink signaling message to the parent node of the IAB node.

In this embodiment, the uplink signaling message is mapped and sent based on the second mapping relationship and the third mapping relationship.

According to a fifth aspect of this application, an integrated access and backhaul donor distributed unit IAB donor DU is provided. The IAB donor DU includes: a receiving unit, configured to receive a signaling message and first indication information that are sent by an integrated access and backhaul donor centralized unit IAB donor CU, where the first indication information is used to indicate a signaling type of the signaling message; and a sending unit, configured to: map, based on the first indication information received by the receiving unit, the signaling message to a transmission channel corresponding to the signaling message, and send the signaling message to an integrated access and backhaul node IAB node, for example, the signaling type corresponding to the signaling message includes an F1AP message related to an access terminal or an F1AP message unrelated to the access terminal.

In this embodiment, the sending unit maps signaling messages of different signaling types to corresponding transmission channels based on an indication of the first indication information, and sends the signaling messages to the IAB node. Because the signaling messages of different signaling types are mapped to different transmission channels, the signaling messages of different signaling types can be distinguished based on the transmission channels between the IAB node and the IAB donor DU. For example, when a signal is weak, a signaling message transmitted on a transmission channel having a higher priority is preferentially transmitted, thereby improving signal transmission reliability.

With reference to the fifth aspect, in a first possible implementation, the first indication information is further used to indicate an SRB bearer type corresponding to an RRC message carried in the F1AP message related to the access terminal. For example, the SRB bearer type is any one of an SRB 0, an SRB 1, or an SRB 2.

In this embodiment, the receiving unit receives only one piece of first indication information from the IAB donor CU. The first indication information is carried in one IE, and is used to: indicate signaling types of signaling messages, and indicate SRB bearer types corresponding to carried RRC messages when the signaling types of the signaling messages are F1AP messages related to the access terminal. In this way, when all the signaling messages are the F1AP messages related to the access terminal, by using only one piece of first indication information, priorities of the signaling messages may be further distinguished based on the SRB bearer types corresponding to the carried RRC messages, so that a priority screening granularity is fined.

With reference to the fifth aspect, in a second possible implementation, the receiving unit is further configured to receive second indication information sent by the IAB donor CU, where the second indication information is used to: when the signaling type of the signaling message is the F1AP message related to the access terminal, indicate an SRB bearer type corresponding to an RRC message carried in the F1AP message related to the access terminal. For example, the SRB bearer type is any one of an SRB 0, an SRB 1, or an SRB 2. Correspondingly, the sending unit is further configured to: map, based on the second indication information received by the receiving unit, the signaling message to a transmission channel corresponding to the signaling message, and send the signaling message to the IAB node.

In this embodiment, the receiving unit separately receives the first indication information and the second indication information from the IAB donor CU. For example, the first indication information and the second indication information are respectively carried in two IEs. The second indication information is used to indicate that the SRB bearer type corresponding to the RRC message carried in the F1AP message related to the access terminal is any one of the SRB 0, the SRB 1, or the SRB 2. Because three transmission channels SRB 0, SRB 1, and SRB 2 have different transmission priorities, a second indication message is used to distinguish SRB bearer types corresponding to RRC messages carried in F1AP messages related to the access terminal. When all the signaling messages are the F1AP messages related to the access terminal, priorities of the signaling messages may be further distinguished based on the SRB bearer types corresponding to the carried RRC messages, so that a priority screening granularity is fined.

With reference to the fifth aspect, in a third possible implementation, the sending unit is further configured to: if the first indication information received by the receiving unit indicates that the signaling type of the signaling message is the F1AP message related to the access terminal, send, to the IAB node through a first transmission channel, the F1AP message related to the access terminal, where the first transmission channel is a newly defined SRB x or a radio link control channel RLC channel x, and x is not 0, 1, 2, or 3; or if the first indication information received by the receiving unit indicates that the signaling type of the signaling message is the F1AP message unrelated to the access terminal, send, to the IAB node through a second transmission channel, the F1AP message unrelated to the access terminal, where the second transmission channel is a newly defined SRB y or an RLC channel y, and v is not 0, 1, 2, 3, or x.

In this embodiment, for the RRC message and two types of messages: the F1AP message related to the access terminal and the F1AP message unrelated to the access terminal, the IAB donor DU respectively sends the RRC message and the two types of messages through different transmission channels, so that a specific sending implementation is fined.

With reference to the first or second possible implementation of the fifth aspect, in a fourth possible implementation, if the signaling type of the signaling message is the F1AP message related to the access terminal, the sending unit is configured to: if the first indication information or the second indication information received by the receiving unit indicates that the SRB bearer type corresponding to the RRC message carried in the F1AP message related to the access terminal is the SRB 0, map the F1AP message related to the access terminal to a third transmission channel, and send the F1AP message related to the access terminal to the IAB node, where the third transmission channel is a newly defined SRB z or a radio link control channel RLC channel z, and z is not 0, 1, 2, 3, x, or y; or if the first indication information or the second indication information received by the receiving unit indicates that the SRB bearer type corresponding to the RRC message carried in the F1AP message related to the access terminal is the SRB 1, map the F1AP message related to the access terminal to a fourth transmission channel, and send the F1AP message related to the access terminal to the IAB node, where the fourth transmission channel is a newly defined SRB m or a radio link control channel RLC channel m, and in is not 0, 1, 2, 3, x, y, or z; or if the first indication information or the second indication information received by the receiving unit indicates that the SRB bearer type corresponding to the RRC message carried in the F1AP message related to the access terminal is the SRB 2, map the F1AP message related to the access terminal to a fifth transmission channel, and send the F1AP message related to the access terminal to the IAB node, where the fifth transmission channel is a newly defined SRB n or a radio link control channel RLC channel n, and n is not 0, 1, 2, 3, x, y, z, or m.

In this embodiment, for F1AP messages that are also related to the access terminal, if sending priorities of signaling messages need to be further distinguished, priorities of RRC messages carried in the F1AP messages related to the access terminal may be distinguished, so that the sending unit respectively sends the F1AP messages related to the access terminal that carry different RRC messages to corresponding transmission channels. In this way, at a finer priority granularity, different sending channels are used for sending, to distinguish messages having different priorities.

With reference to any one of the first to fourth possible implementations of the fifth aspect, in a fifth possible implementation, the first indication information is carried in an F1AP message; or the first indication information is carried in a differentiated services code point DSCP field or a flow label field in an IP header field.

In this embodiment, the first indication information is carried in the F1AP message. This complies with an alternative 2 architecture 3GPP R15. The first indication information is carried in the differentiated services code point DSCP or the flow label in the IP header field and sent to the IAB node by using an IP route. This complies with an alternative 4 architecture in 3GPP R15.

With reference to the fifth possible implementation of the fifth aspect, in a sixth possible implementation, if the first indication information is carried in the DSCP field or the flow label field in the IP header field, the receiving unit is further configured to: receive an identifier corresponding to a transmission channel between the IAB donor DU and the IAB node and the DSCP or the flow label value that are sent by the IAB donor CU, for example, the DSCP or the flow label value is in a one-to-one correspondence with the identifier corresponding to the transmission channel; or receive the signaling type of the signaling message and the DSCP or the flow label value that are sent by the IAB donor CU, for example, the type of the signaling message is in a one-to-one correspondence with the DSCP or the flow label value.

In this embodiment, the first indication information is carried in the DSCP field or the flow label field in the IP layer header field.

With reference to any one of the first to sixth possible implementations of the fifth aspect, in a seventh possible implementation, the IAB donor DU further includes an establishment unit, configured to establish a transmission channel that corresponds to the signaling type of the signaling message and that is between the IAB node and the IAB donor DU, where the transmission channel may be a newly defined SRB or an RLC channel.

According to a sixth aspect of this application, an integrated access and backhaul donor centralized unit IAB donor CU is provided. The IAB donor CU includes: a sending unit, configured to send a signaling message and first indication information to an integrated access and backhaul donor distributed unit IAB donor DU, where the first indication information is used to indicate a signaling type of the signaling message. For example, the signaling type corresponding to the signaling message includes an F1AP message related to an access terminal or an F1AP message unrelated to the access terminal.

In this embodiment, the IAB donor CU sends the first indication information while sending the signaling message to the IAB donor DU, where the first indication information is used to indicate that the signaling type of the signaling message is a UE-associated F1AP message or a non-UE-associated F1AP message, so that the IAB donor DU can know, based on the first indication information, a signaling type of the received signaling message. In this way, the IAB donor DU can map signaling messages of different signaling types to corresponding transmission channels, and send the signaling messages to an IAB node. Because the signaling messages of different signaling types are mapped to different transmission channels, the signaling messages of different signaling types can be distinguished based on the transmission channels between the IAB node and the IAB donor DU.

For example, when a signal is weak, a signaling message transmitted on a transmission channel having a higher priority is preferentially transmitted, thereby improving signal transmission reliability.

With reference to the sixth aspect, in a first possible implementation, the first indication information is further used to indicate an SRB hearer type corresponding to an RRC message carried in the F1AP message related to the access terminal, where the SRB bearer type is any one of an SRB 0, an SRB 1, or an SRB 2.

In this embodiment, the sending unit sends only one piece of first indication information to the IAB donor DU. The first indication information is carried in one IE, and is used to: indicate signaling types of signaling messages, and indicate SRB bearer types corresponding to carried RRC messages when the signaling types of the signaling messages are F1AP messages related to the access terminal. In this way, when all the signaling messages are the F1AP messages related to the access terminal, by using only one piece of first indication information, priorities of the signaling messages may be further distinguished based on the SRB bearer types corresponding to the carried RRC messages, so that a priority screening granularity is fined.

With reference to the sixth aspect, in a second possible implementation, the sending unit is further configured to send second indication information to the IAB donor DU, where the second indication information is used to: when the signaling type of the signaling message is the F1AP message related to the access terminal, indicate an SRB bearer type corresponding to an RRC message carried in the F1AP message related to the access terminal, and the SRB bearer type is any one of an SRB 0, an SRB 1, or an SRB 2.

In this embodiment, the sending unit separately sends the first indication information and the second indication information to the IAB donor DU. For example, the first indication information and the second indication information are respectively carried in two IEs. The second indication information is used to indicate that the SRB bearer type corresponding to the RRC message carried in the F1AP message related to the access terminal is any one of the SRB 0, the SRB 1, or the SRB 2. A priority of the SRB bearer type is as follows: A priority of the SRB 2 is higher than a priority of the SRB 1, and the priority of the SRB 1 is higher than a priority of the SRB 0. Because three transmission channels SRB 0, SRB 1, and SRB 2 have different transmission priorities, a second indication message is used to distinguish SRB bearer types corresponding to RRC messages carried in F1AP messages related to the access terminal. When all the signaling messages are the F1AP messages related to the access terminal, priorities of the signaling messages may be further distinguished based on the SRB bearer types corresponding to the carried RRC messages, so that a priority screening granularity is fined.

With reference to any one of the sixth aspect or the first or second possible implementation of the sixth aspect, in a third possible implementation, the first indication information is carried in an F1AP message; or the first indication information is carried in a differentiated services code point DSCP field or a flow label field in an IP header field.

In this embodiment, the first indication information is carried in the F1AP message. This complies with an alternative 2 architecture in 3GPP R15.

With reference to the third possible implementation of the sixth aspect, in a fourth possible implementation, if the first indication information is carried in the differentiated services code point DSCP field or the flow label field in the IP header field, the sending unit is further configured to: send an identifier corresponding to a transmission channel between the IAB donor DU and the IAB node and the DSCP or the flow label value to the IAB donor DU, for example, the DSCP or the flow label value is in a one-to-one correspondence with the identifier corresponding to the transmission channel; or send the signaling type of the signaling message and the DSCP or the flow label value to the IAB donor DU, for example, the type of the signaling message is in a one-to-one correspondence with the DSCP or the flow label value.

In this embodiment, the first indication information is carried in the DSCP field or the flow label field in the IP layer header field.

With reference to any one of the sixth aspect or the first to fourth possible implementations of the fifth aspect, in a fifth possible implementation, the IAB donor CU further includes an indication unit, configured to indicate the IAB donor DU to establish a transmission channel that corresponds to the signaling type of the signaling message and that is between the IAB node and the IAB donor DU. For example, the transmission channel may be a newly defined SRB or an RLC channel.

According to a seventh aspect of this application, an integrated access and backhaul node IAB node is provided. The IAB node includes: a receiving unit, configured to receive a signaling message sent by a first node; and a sending unit, configured to: map the signaling message received by the receiving unit to a transmission channel corresponding to the signaling message, and send the signaling message to a second node, for example, the signaling type corresponding to the signaling message includes an F1AP message related to an access terminal or an F1AP message unrelated to the access terminal.

In this embodiment, an IAB node is used for signaling transmission between user equipment UE and an integrated access and backhaul donor distributed unit IAB donor DU. There may be one or more IAB nodes. One IAB node indicates a one-hop data backhaul scenario. A plurality of IAB nodes indicate a multi-hop backhaul scenario. In the multi-hop backhaul scenario, signaling needs to be transmitted between the plurality of IAB nodes one by one until the signaling arrives at the UE. During message sending, the IAB node maps signaling messages to corresponding transmission channels based on types of the signaling messages, so that the IAB node can distinguish the signaling messages of the different signaling types based on the transmission channels during signal sending. For example, when a signal is weak, a signaling message transmitted on a transmission channel having a higher priority is preferentially transmitted, thereby improving signal transmission reliability.

With reference to the seventh aspect, in a first possible implementation, the receiving unit is further configured to: obtain an identifier corresponding to the transmission channel that corresponds to the signaling message sent by the first node. Correspondingly, the IAB node further includes a determining unit, configured to determine, based on the identifier corresponding to the transmission channel, the transmission channel corresponding to the signaling message.

In this embodiment, the IAB node does not know the signaling type of the signaling message, but obtains only the identifier sent by the first node, maps the received signaling message to the transmission channel corresponding to the identifier, and sends the signaling message to the second node.

With reference to the first possible implementation of the seventh aspect, in a second possible implementation, the identifier corresponding to the transmission channel is a logical channel identifier LCID corresponding to the transmission channel.

With reference to the seventh aspect, in a third possible implementation, the receiving unit is further configured to obtain, from an adaptation layer, the signaling type corresponding to the signaling message, where the adaptation layer is a protocol layer between the IAB node and the first node.

In this embodiment, the IAB node obtains, through the adaptation layer, the signaling type corresponding to the signaling message, maps the signaling message to the corresponding transmission channel based on the signaling type, and sends the signaling message to the second node.

With reference to the seventh aspect, in a fourth possible implementation, the IAB node includes an IAB node distributed unit DU and an IAB node mc)bile terminal unit MT. The receiving unit is further configured to: obtain, from the IAB node DU, the signaling type corresponding to the signaling message; or obtain, from an upper-layer protocol stack of the IAB node MT, the signaling type corresponding to the signaling message.

In this embodiment, the IAB node specifically includes two network elements: the IAB node DU and the IAB node MT. In two different manners, the signaling message is mapped to the corresponding transmission channel and sent to the second node.

In this embodiment, in the first aspect to the seventh aspect, the identifier corresponding to the transmission channel may be a logical channel identifier, namely, an LCID or an LCH ID.

According to an eighth aspect of this application, an access node IAB node of a terminal device is provided. The IAB node includes: a determining unit, configured to determine a signaling type of a to-be-sent uplink signaling message; and a sending unit, configured to: map, based on an uplink mapping relationship obtained from an integrated access and backhaul donor centralized unit IAB donor CU, the to-be-sent uplink signaling message whose signaling type is determined by the determining unit to a corresponding transmission channel, and send the to-be-sent uplink signaling message to a parent node of the IAB node.

According to a ninth aspect of this application, a communications apparatus is provided. The apparatus includes a transceiver, a processor, and a memory. The processor is configured to control the transceiver to send and receive a signal, the memory is configured to store a computer program, and the processor is configured to invoke and run the computer program stored in the memory, to enable a terminal device to perform the mapping method according to any one of the possible implementations of the first aspect. The communications apparatus may be a communications apparatus in an IAB system or a system chip in the communications apparatus.

According to a tenth aspect of this application, a communications apparatus is provided. The apparatus includes a transceiver, a processor, and a memory. The processor is configured to control the transceiver to send and receive a signal, the memory is configured to store a computer program, and the processor is configured to invoke and run the computer program stored in the memory, to enable a terminal device to perform the mapping method according to any one of the possible implementations of the second aspect. The communications apparatus may be a communications apparatus in an IAB system or a system chip in the communications apparatus.

According to an eleventh aspect of this application, a communications apparatus is provided. The apparatus includes a transceiver, a processor, and a memory. The processor is configured to control the transceiver to send and receive a signal, the memory is configured to store a computer program, and the processor is configured to invoke and run the computer program stored in the memory, to enable a terminal device to perform the mapping method according to any one of the possible implementations of the third aspect. The communications apparatus may be a communications apparatus in an IAB system or a system chip in the communications apparatus.

According to a twelfth aspect of this application, a computer program product is provided. The computer program product includes computer program code. When the computer program code is run on a computer, the computer is enabled to perform the method according to any one of the possible implementations of the first aspect.

According to a thirteenth aspect of this application, a computer program product is provided. The computer program product includes computer program code. When the computer program code is run on a computer, the computer is enabled to perform the method according to any one of the possible implementations of the second aspect.

According to a fourteenth aspect of this application, a computer program product is provided. The computer program product includes computer program code. When the computer program code is run on a computer, the computer is enabled to perform the method according to any one of the possible implementations of the third aspect.

According to a fifteenth aspect of this application, a computer program product is provided. The computer program product includes computer program code. When the computer program code is run on a computer, the computer is enabled to perform the method according to any one of the possible implementations of the fourth aspect.

It can be learned from the foregoing technical solutions that the embodiments of this application have the following advantages:

Embodiments of the present disclosure provide a mapping method, a node, a communications apparatus, and a storage medium. The mapping method includes: An integrated access and backhaul donor distributed unit IAB donor DU receives a signaling message and first indication information that are sent by an integrated access and backhaul donor centralized unit IAB donor CU, where the first indication information is used to indicate a signaling type of the signaling message. The IAB donor DU maps, based on the signaling type of the signaling message, the signaling message to a transmission channel corresponding to the signaling message, and sends the signaling message to an integrated access and backhaul node IAB node. For example, the signaling type includes an F1AP message related to an access terminal or an F1AP message unrelated to the access terminal. In the embodiments of this application, signaling messages of different signaling types are respectively mapped to different signaling transmission channels. Therefore, different signaling transmission channels are respectively established for the signaling messages of different signaling types. When a signal is weak, a node may selectively and preferentially perform transmission on a signaling transmission channel that carries a signaling message having a higher priority, thereby improving network transmission quality.

BRIEF DESCRIPTION OF DRAWINGS

FIG. 8(a) to FIG. 8(c) are a schematic diagram of sending a data packet in an alternative 4 architecture according to an embodiment of this application;

DESCRIPTION OF EMBODIMENTS

Figure 1A:
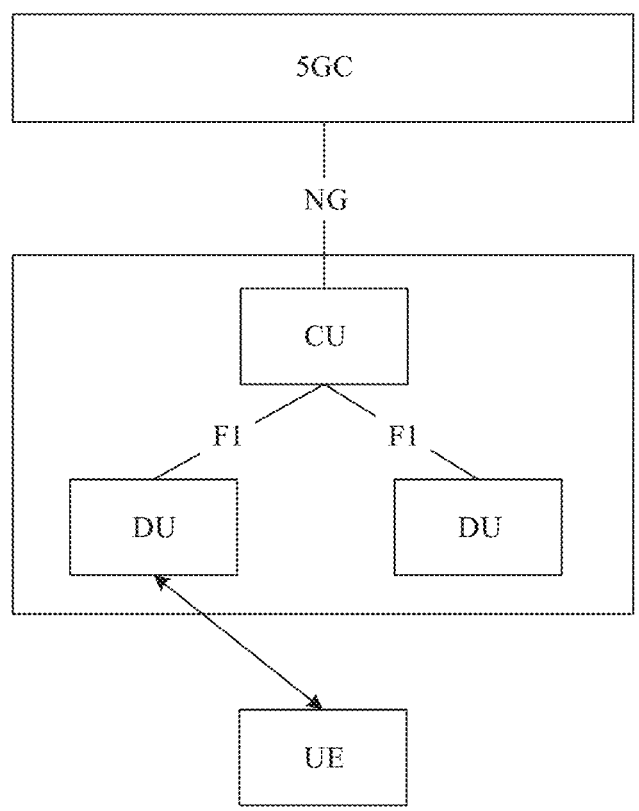
FIG. 1a is an architectural diagram of a CU-DU split architecture according to an embodiment of this application.

Embodiments of the present disclosure provide a mapping method, a node, a communications apparatus, and a storage medium, so that a corresponding transmission channel can be created based on a signaling type of a signaling message. In a signaling transmission process, the signaling message is mapped to the corresponding transmission channel based on the signaling type of the signaling message for sending, so that priorities of signaling messages can be distinguished through different transmission channels, thereby improving signaling transmission quality.

To make a person skilled in the art understand the solutions of this application better, the following describes the technical solutions in the embodiments of this application with reference to the accompanying drawings in the embodiments of this application. It is clear that, the described embodiments are merely a part rather than all of the embodiments of this application. All other embodiments obtained by a person of ordinary skill in the art based on the embodiments of this application without creative efforts shall fall within the protection scope of this application.

In the specification, claims, and accompanying drawings of this application, the terms "first", "second", "third", "fourth", and the like (if existent) are intended to distinguish between similar objects but do not necessarily indicate a specific order or sequence. It should be understood that the specific order or sequence termed in such a way is interchangeable in proper circumstances, so that the embodiments described herein can be implemented in an order other than the order illustrated or described herein. In addition, the terms "include", "have" and any other variants thereof are intended to cover non-exclusive inclusion. For example, a process, method, system, product, or device that includes a list of steps or units is not necessarily limited to those steps or units that are expressly listed, but may include other steps or units that are not expressly listed or inherent to the process, method, product, or device.

In the embodiments of this application, the communications apparatus is an apparatus that is deployed in a radio access network to provide a wireless communication function for user equipment UE. The communications apparatus may include various forms of macro base stations, micro base stations (also referred to as small cells), relay stations, access points, and the like. In systems using different radio access technologies, a device having a base station function may have different names. For example, in a 5th generation (5G) system, the device is referred to as a wireless network access device or a gNB. For ease of description, in all the embodiments of this application, all the foregoing apparatuses that provide the wireless communication function for a terminal are collectively referred to as a communications apparatus, a base station, or a node.

The UE in the embodiments of this application may include various handheld devices, vehicle-mounted devices, wearable devices, or computing devices that have a wireless communication function, or other processing devices connected to a wireless modem. The terminal may be a mobile station (MS), a subscriber unit, a cellular phone, a smartphone, a wireless data card, a personal digital assistant (PDA) computer, a tablet computer, a wireless modem, a handheld device (handset), a laptop computer, a machine type communication (MTC) terminal, or the like.

As shown in FIG. 1a, in 3GPP R15, a gNB may use a CU-DU split architecture. To be specific, a gNB may include one CU and one or more DUs. For example, the CU and the DU are connected to each other by using an F1 interface, and the CU and a core network 5GC are connected to each other by using an NG interface, as shown in the following figure.

UE accesses the CU through the DU. In other words, a PHY/a MAC/an RLC layer peer to the UE is located on the DU, and a PDCP/an RRC layer peer to the UE is located on the CU.

Figure 1B:
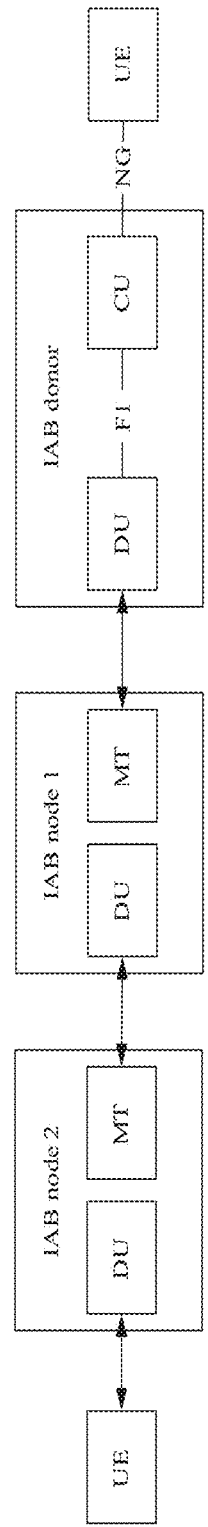
FIG. 1b is an architectural diagram of a two-hop data backhaul scenario according to an embodiment of this application.

As shown in FIG. 1b, two nodes: an IAB node and an IAB donor are introduced to R15 IAB. In a CU-DU split architecture, the IAB node includes two parts: an IAB node MT and an IAB node DU, and the IAB donor includes two parts: an IAB donor CU and an IAB donor DU.

Figure 1C:
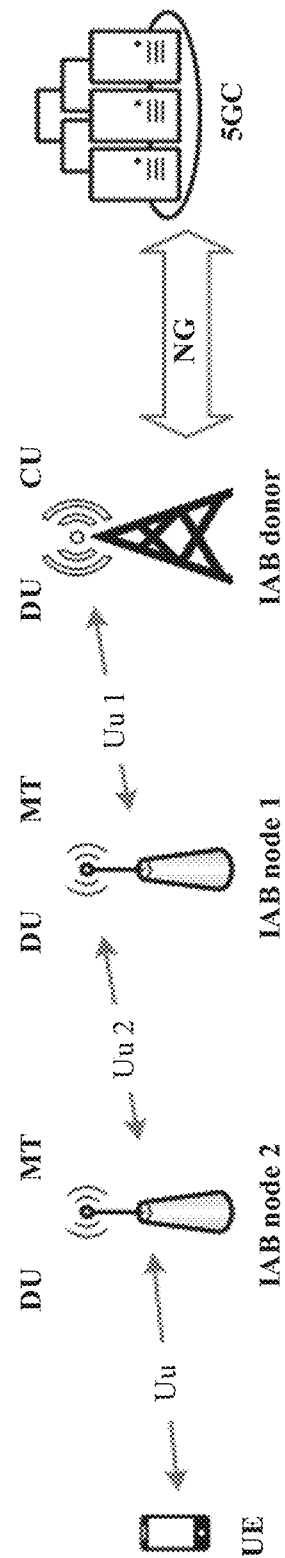
FIG. 1c is a topology diagram of a two-hop data backhaul scenario according to an embodiment of this application.

A two-hop data backhaul scenario is used as an example. A topology diagram of the two-hop data backhaul scenario is shown in FIG. 1c.

An integrated access and backhaul (IAB) technology in the embodiments of this application is a transmission technology in a 5th generation (5G) system. An integrated access and backhaul donor (IAB donor) accesses a 5G core 5GC by using an NG interface. An integrated access and backhaul node (IAB node) accesses the IAB donor by using an Un interface, so that a signal transmission link is formed. User equipment (UE) needs only to access the IAB node, and then may access a 5G network. Based on the foregoing architecture, two nodes: the IAB node and the IAB donor need to be passed through in sequence during signaling exchange between the UE and a network side. In a multi-hop data backhaul scenario, a plurality of IAB nodes need to be passed through. For example, in an uplink data transmission scenario using two-hop data backhaul, signaling sent by UE needs to pass through an IAB node 2 and an IAB node 1, and then arrives at an IAB donor. For example, the IAB node 2 and the IAB node 1 are connected to each other by using a Un 2 interface, and the IAB node 1 and the IAB donor are connected to each other by using a Un 1 interface. A link between the Un 2 interface and the Un 1 interface may be referred to as a backhaul link, and a Uu interface link between the UE and the IAB node 2 is referred to as an access link.

A plurality of types of signaling messages, which may be an RRC message or an F1AP message, may be transmitted on the backhaul link. Optionally, the F1 application protocol (F1AP) message may be further classified into an F1AP message related to an access terminal or an F1AP message unrelated to the access terminal. For example, the F1AP message related to the access terminal may be a UE-associated F1AP message, and the F1AP message unrelated to the access terminal may be a non UE-associated F1AP message. The UE-associated F1AP message is mainly used for UE context management, RRC message transmission, and the like of an F1 interface. The non-UE-associated F1AP message is mainly used for management of an F1 interface, such as setup, reset, and configuration update of the F1 interface. Optionally, the RRC message may be carried on an SRB 0 for transmission, or may be carried on an SRB 1 or an SRB 2 for transmission. Different signaling messages have different priorities. A transmission priority of the non-UE-associated F1AP message is usually higher than that of the UE-associated F1AP message. A transmission priority of an RRC message carried on the SRB 0 is higher than that of an RRC message carried on the SRB 1 or the SRB 2, and the transmission priority of the RRC message carried on the SRB 1 is higher than that of the RRC message carried on the SRB 2.

Currently, signaling transmission on the backhaul link has not been discussed. If different types of signaling messages cannot be distinguished on the backhaul link, low-priority signaling may be processed before high-priority signaling. Consequently, an error occurs on the link, resulting in impact on network performance.

Figure 1D:
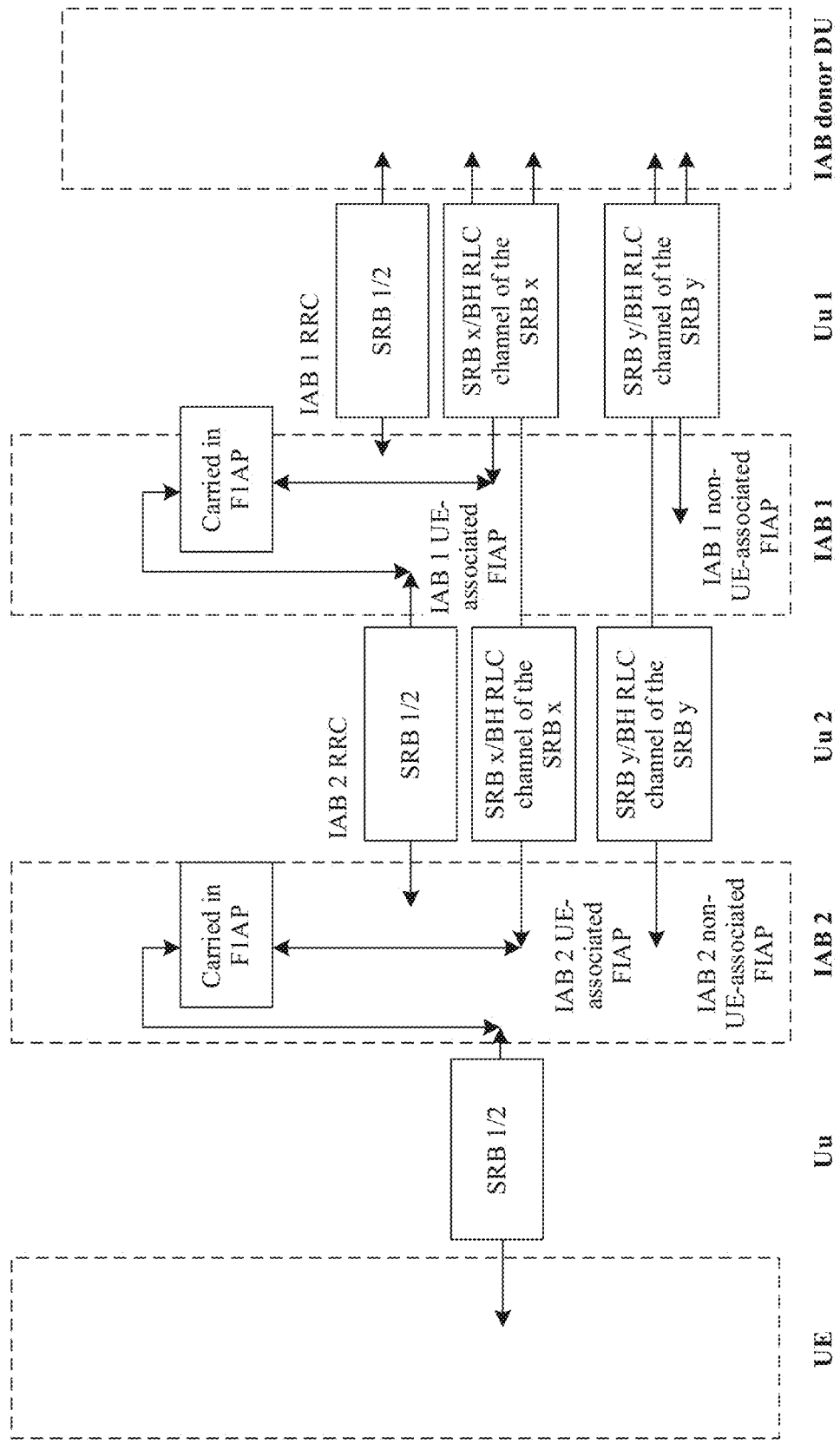
FIG. 1d is a signaling flow diagram of a mapping method according to an embodiment of this application.
Figure 2:
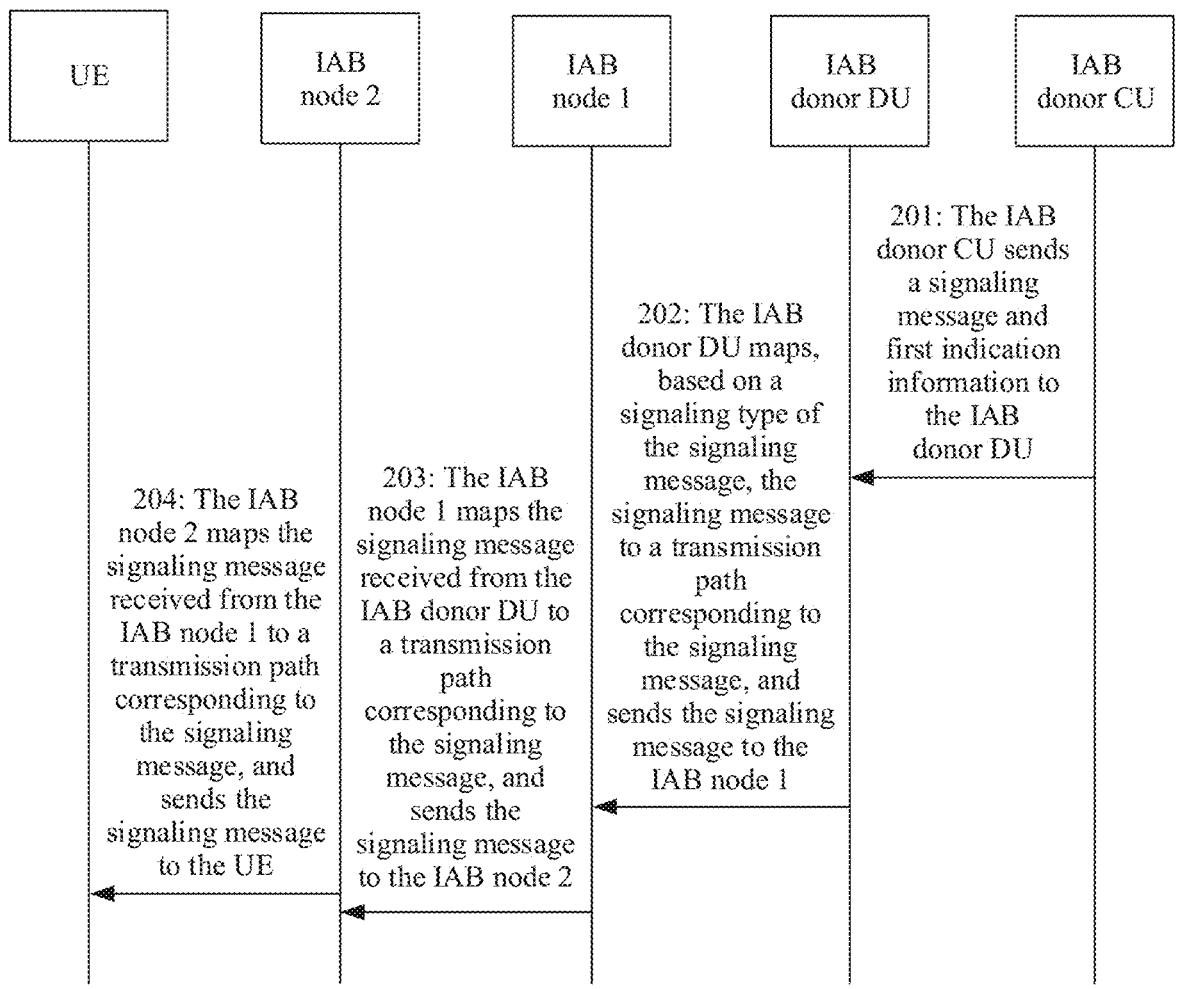
FIG. 2 is a schematic diagram of an embodiment of a mapping method according to an embodiment of this application.

To resolve the foregoing problem, the embodiments provide a mapping method, so that a corresponding transmission channel can be created based on a signaling type of a signaling message. In a signaling transmission process, the signaling message is mapped to the corresponding transmission channel based on the signaling type of the signaling message for sending, so that priorities of signaling messages can be distinguished through different transmission channels, thereby improving signaling transmission quality. For ease of understanding, the following describes a specific procedure of the technical solutions of this application by using a two-hop data backhaul scenario as an example. It should be noted that, the technical solutions provided in the embodiments of this application are not limited to the two-hop data backhaul scenario, and data backhaul falls within the protection scope of this application regardless of a quantity of hops in the data backhaul, provided that a same mapping method is used. Refer to FIG. 1d and FIG. 2. The first embodiment of the mapping method according to the embodiments of this application includes the following steps.

The two-hop data backhaul scenario is used as an example. In a mapping transmission process of a downlink signaling message, the following steps are included.

201: An IAB donor CU sends a signaling message and first indication information to an integrated access and backhaul donor distributed unit IAB donor DU.

In this embodiment, the IAB donor CU has some functions of a gNB, for example, a function of a PDCP/an RRC layer, to control all UE and IAB nodes of the IAB donor CU. Therefore, the IAB donor CU may generate/process an RRC message. In addition, there is an F1 interface between the IAB donor CU and the IAB donor DU and an F1 interface between the IAB donor CU and an IAB node DU. Therefore, the IAB donor CU may further generate/process an F1AP message.

In this embodiment, the first indication information is used to indicate a signaling type of the signaling message. The signaling type includes an F1AP message related to an access terminal or an F1AP message unrelated to the access terminal. The F1AP message related to the access terminal may be a UE-associated F1AP message, and the F1AP message unrelated to the access terminal may be a non-UE-associated F1AP message. For example, the F1AP message related to the access terminal may be an F1AP message related to a user terminal or an F1AP message related to an IAB node MT and the F1AP message unrelated to the access terminal may be an F1AP message unrelated to the user terminal or an F1AP message unrelated to the IAB node MT. The non-UE-associated F1AP message has a higher priority than the UE-associated F1AP message. The IAB donor DU has some other functions of the gNB, for example, a function of a PHY/a MAC/an RLC layer, to provide an access service for a child node of the IAB donor DU.

Optionally, the first indication information may be further used to indicate an SRB bearer type corresponding to an RRC message carried in the UE-associated F1AP message. For example, the SRB bearer type is any one of an SRB 0, an SRB 1, or an SRB 2.

In this embodiment, an RRC message is carried in the UE-associate F1AP message, and different RRC messages have different sending priorities. For example, an RRC message carried on the SRB 0 has the highest priority, an RRC message carried on the SRB 1 have the second highest priority, and an RRC message carried on the SRB 2 have the lowest priority. Different priorities of the RRC messages indicate that UE-associated F1AP messages that carry different RRC messages have different priorities. The first indication information is used to indicate SRB bearer types corresponding to the RRC messages carried in the UE-associated F1AP messages, so that priorities of the UE-associated F1AP messages can be further distinguished.

Optionally, an indication of the SRB bearer type corresponding to the RRC message carried in the UE-associated F1AP message may be further carried in second indication information. The second indication information is different from the first indication information.

202: The IAB donor DU maps, based on the signaling type of the signaling message, the signaling message to a transmission channel corresponding to the signaling message, and sends the signaling message to a first integrated access and backhaul node IAB node 1.

It should be noted that, the IAB node 1 may further include two network elements: a first integrated access and backhaul node mobile terminal IAB node 1 MT and a first integrated access and backhaul node distributed unit IAB node 1 DU.

In this embodiment, the signaling message sent by the IAB donor DU to the IAB node 1 includes the following several types:

an RRC message of the IAB node 1 MT;

a UE-associated F1AP message of the IAB node 1 DU;

a non-UE-associated F1AP message of the IAB node 1 DU;

a UE-associated F1AP message of an IAB node 2 DU; and/or a non-UE-associated F1AP message of the IAB node 2 DU.

For example, an RRC message of an IAB node 2 MT may be carried in the UE-associated F1AP message of the IAB node 1 DU, and an RRC message of the UE may be carried in the UE-associated F1AP message of the IAB node 2 DU.

The following several mapping manners are used for the foregoing signaling messages of different signaling types.

Manner 1: One-to-One Mapping Manner

The RRC message of the IAB node 1 MT is mapped to a first transmission channel and sent to the IAB node 1. For example, the first transmission channel may be the SRB 0, the SRB 1, or the SRB 2.

The UE-associated F1AP message of the IAB node 1 DU is mapped to a second transmission channel and sent to the IAB node 1. For example, the second transmission channel may be a newly defined SRB (different from an existing SRB 0/SRB 1/SRB 2/SRB 3), or may be an RLC channel.

The non-UE-associated F1AP message of the IAB node 1 DU is mapped to a third transmission channel and sent to the IAB node 1. For example, the third transmission channel may be a newly defined SRB (different from an existing SRB 0/SRB 1/SRB 2/SRB 3), or may be an RLC channel.

The UE-associated F1AP message of the IAB node 2 DU is mapped to a fourth transmission channel and sent to the IAB node 1. For example, the fourth transmission channel may be a newly defined SRB (different from an existing SRB 0/SRB 1/SRB 2/SRB 3), or may be an RLC channel.

The non-UE-associated F1AP message of the IAB node 2 DU is mapped to a fifth transmission channel and sent to the IAB node 1. For example, the fifth transmission channel may be a newly defined SRB (different from an existing SRB 0/SRB 1/SRB 2/SRB 3), or may be an RLC channel.

Manner 2: Many-to-One Mapping Manner

The RRC message of the IAB node 1 MT is mapped to a first transmission channel and sent to the IAB node 1. For example, the first transmission channel may be the SRB 0, the SRB or the SRB 2.

The UE-associated F1AP message of the IAB node 1 DU and the UE-associated F1AP message of the IAB node 2 DU are mapped to a second transmission channel and sent to the IAB node 1. For example, the second transmission channel may be a newly defined SRB (different from an existing SRB 0/SRB 1/SRB 2/SRB 3), or may be an RLC channel.

The non-UE-associated F1AP message of the IAB node 1 DU and the non-UE-associated F1AP message of the IAB node 2 DU are mapped to a third transmission channel and sent to the IAB node 1. For example, the third transmission channel may be a newly defined. SRB (different from an existing SRB 0/SRB 1/SRB 2/SRB 3), or may be an RLC channel.

Optionally, an RRC message may be carried in the UE-associated F1AP message. If the one-to-one mapping manner is used, UE-associated F1AP messages that carry RRC messages having different priorities each are mapped to an independent transmission channel and sent to the IAB node 1.

If the many-to-one mapping manner is used, UE-associated F1AP messages that carry RRC messages having a same priority are mapped to a same transmission channel and sent to the IAB node 1. For example, an RRC message 1 of the IAB node 2 MT is carried in a UE-associated F1AP message 1 of the IAB node 1 DU, an RRC message 2 of the IAB node 2 MT is carried in a UE-associated F1AP message 2 of the IAB node 1 DU, an RRC message 1 of the UE is carried in a UE-associated F1AP message 1 of the IAB node 2 DU, and an RRC message 2 of the UE is carried in the UE-associated F1AP message 1 of the IAB node 2 DU. If the RRC message 1 of the IAB node 2 MT and the RRC message 1 of the UE have a same priority (for example, these RRC messages are carried on the SRB 1 for transmission), and the RRC message 2 of the IAB node 2 MT and the RRC message 2 of the UE have a same priority (for example, these RRC messages are carried on the SRB 2 for transmission), the UE-associated F1AP message 1 of the IAB node 1 DU and the UE-associated F1AP message 1 of the IAB node 2 DU are mapped to a transmission channel, and the UE-associated F1AP message 2 of the IAB node 1 DU and the UE-associated F1AP message 2 of the IAB node 2 DU are mapped to another transmission channel.

If the many-to-one mapping manner is used, optionally, UE-associated. F1AP messages that carry RRC messages having a same priority may alternatively be mapped to a same transmission channel and sent to the IAB node 1. For example, an RRC message 1 of the IAB node 2 MT is carried in a UE-associated F1AP message 1 of the IAB node 1 DU, and an RRC message 1 of the UE is carried in a UE-associated F1AP message 1 of the IAB node 2 DU. If an RRC message 1 of the IAB node 1 MT, the RRC message 1 of the IAB node 2 MT, and the RRC message 1 of the UE have a same priority (for example, these RRC messages are carried on the SRB 1 for transmission), the RRC message 1 of the IAB node 1 MT, the UE-associated F1AP message 1 of the IAB node 1 DU, and the UE-associated F1AP message 1 of the IAB node 2 DU are mapped to a same transmission channel.

Specifically, the transmission channel may be a newly defined SRB (different from an existing SRB 0/SRB 1/SRB 2/SRB 3), the existing SRB (SRB 0/SRB 1/SRB 2), an RLC channel corresponding to the existing SRB, or another RLC channel.

It should be noted that the IAB donor CU and the IAB donor DU may be two independent devices, or may be integrated into a same communications apparatus. The communications apparatus may be an integrated access and backhaul donor IAB donor.

203: The IAB node 1 maps the signaling message received from the IAB donor DU to a transmission channel corresponding to the signaling message, and sends the signaling message to an IAB node 2.

It should be noted that, the IAB node 2 may further include two network elements: a second integrated access and backhaul node mobile terminal IAB node 2 MT and a second integrated access and backhaul node distributed unit IAB node 2 DU.

In this embodiment, the signaling message sent by the IAB node 1 to the IAB node 2 includes the following several types:

an RRC message of the IAB node 2 MT;
a UE-associated F1AP message of the IAB node 2 DU; and/or
a non-UE-associated F1AP message of the IAB node 2 DU.

For example, an RRC message of the UE may be carried in the UE-associated F1AP message of the IAB node 2 DU.

Similarly, the following several mapping manners are used for the foregoing signaling messages of different signaling types.

Manner 1: One-to-One Mapping Manner

The RRC message of the IAB node 2 MT is mapped to a first transmission channel and sent to the IAB node 2. For example, the first transmission channel may be the SRB 0, the SRB 1, or the SRB 2.

The UE-associated F1AP message of the IAB node 2 DU is mapped to a second transmission channel and sent to the IAB node 2. For example, the second transmission channel may be a newly defined SRB (different from an existing SRB 0/SRB 1/SRB 2/SRB 3), or may be an RLC channel. Optionally, UE-associated F1AP messages that carry RRC messages having different priorities each may be mapped to an independent transmission channel and sent to the IAB node 2.

The non-UE-associated F1AP message of the IAB node 2 DU is mapped to a third transmission channel and sent to the IAB node 2. For example, the third transmission channel may be a newly defined SRB (different from an existing SRB 0/SRB 1/SRB 2/SRB 3), or may be an RLC channel.

Manner 2: Many-to-One Mapping Manner

UE-associated F1AP messages that carry RRC messages having a same priority are mapped to a same transmission channel and sent to the IAB node 2. For example, an RRC message 1 of the UE is carried in a UE-associated F1AP message 1 of the IAB node 2 DU. If an RRC message 1 of the IAB node 2 MT and the RRC message 1 of the UE have a same priority (for example, these RRC messages are carried on the SRB 1 for transmission), the RRC message 1 of the IAB node 2 MT and the UE-associated F1AP message 1 of the IAB node 2 DU are mapped to a same transmission channel.

For example, the transmission channel may be a newly defined SRB (different from an existing SRB 0/SRB 1/SRB 2/SRB 3), the existing SRB (SRB 0/SRB 1/SRB 2), an RLC channel corresponding to the existing SRB, or another RLC channel.

It should be noted that the IAB donor CU and the IAB donor DU may be two independent devices, or may be integrated into a same communications apparatus. The communications apparatus may be an integrated access and backhaul donor IAB donor.

204: The IAB node 2 maps the signaling message received from the IAB node 1 to a transmission channel corresponding to the signaling message, and sends the signaling message to the UE.

In this embodiment, the signaling message received by the IAB node 2 from the IAB node 1 includes two signaling types: a UE-associated F1AP message of the IAB node 2 DU and a non-UE-associated F1AP message of the IAB node 2 DU. For example, a UE RRC message may be carried in the UE-associated F1AP message of the IAB node 2 DU. The IAB node 2 DU extracts the UE RRC message from the received UE-associated F1AP message, maps the UE RRC message to a corresponding SRB based on an indication of an SRB bearer type corresponding to the UE RRC message carried in the UE-associated F1AP message, and sends the UE RRC message to the UE.

It should be noted that the method according to the embodiments of this application is described in the foregoing by using only the two-hop data backhaul scenario as an example. In an actual working process, one-hop data backhaul or multi-hop data backhaul may alternatively be used. For example, there is only one IAB node in a one-hop data backhaul scenario, and the IAB node performs a receiving step of the IAB node 1 and a sending step of the IAB node 2. There are a plurality of IAB nodes in a multi-hop data backhaul scenario. For example, an IAB node closest to the IAB donor DU is the IAB node 1, and an IAB node closest to the UE is the IAB node 2. A plurality of IAB nodes between the IAB node 1 and the IAB node 2 perform a receiving step of the IAB node 2 and a sending step of the IAB node 1.

Figure 3:
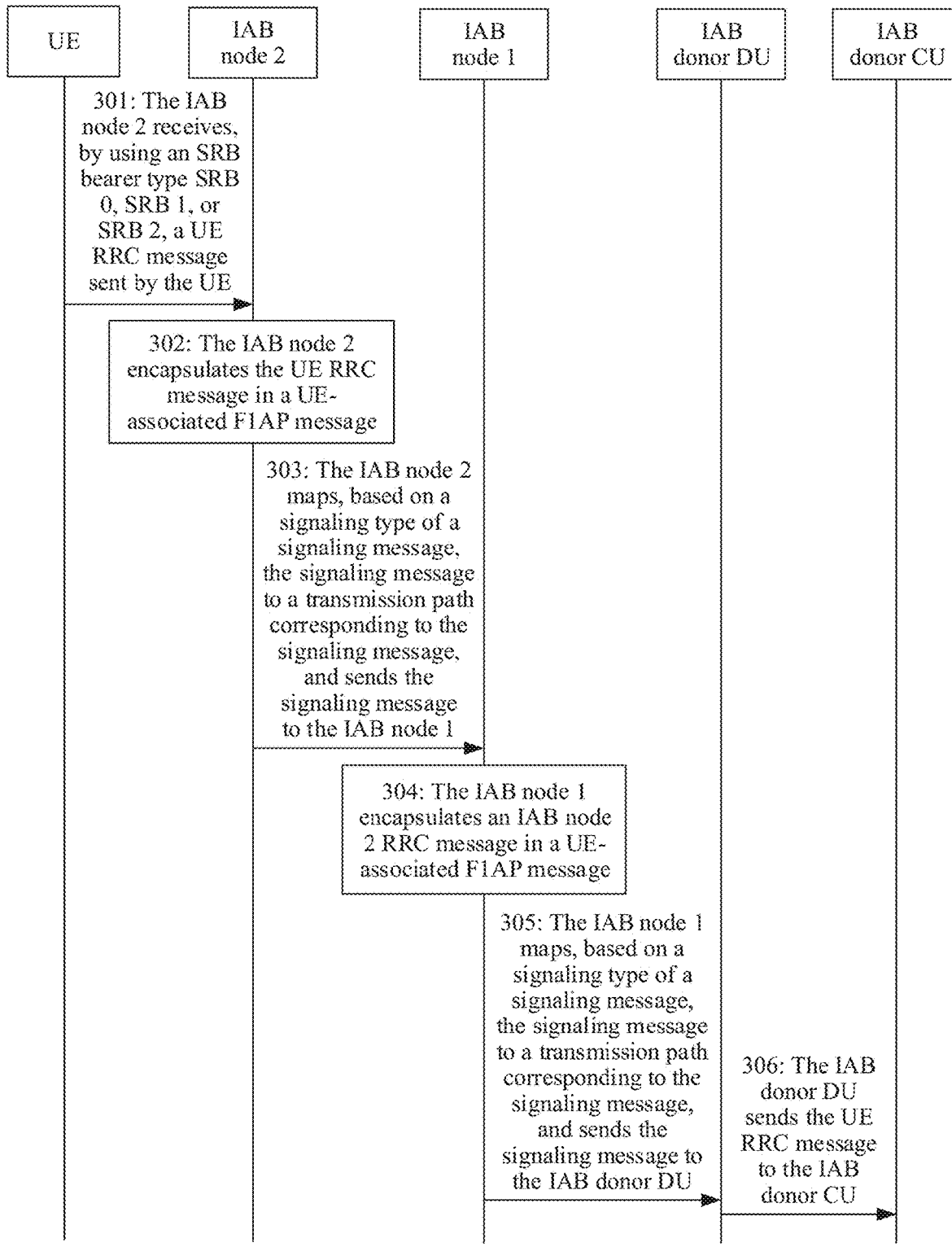
FIG. 3 is a schematic diagram of another embodiment of a mapping method according to an embodiment of this application.

The foregoing first embodiment describes a downlink signaling transmission manner in the embodiments of this application. The following describes an uplink signaling transmission manner. Refer to FIG. 1d and FIG. 3. The second embodiment of the mapping method according to the embodiments of this application includes the following steps.

The two-hop data backhaul scenario is used as an example. In a mapping transmission process of an uplink signaling message, the following steps are included.

301: An IAB node 2 receives, by using an SRB bearer type SRB 0, SRB 1, or SRB 2, a UE RRC message sent by UE.

In this embodiment, the UE RRC message is an RRC message sent by the UE to an IAB donor CU.

302: The IAB node 2 encapsulates the UE RRC message in a UE-associated F1AP message of an IAB node 2 DU.

In this embodiment, because the UE RRC message is the RRC message sent by the UE to the IAB donor CU, the UE RRC message needs to pass through the IAB node 2, an IAB node 1, and an IAB donor DU in sequence. The IAB node 2 DU generates the UE-associated F1AP message, and encapsulates the received UE RRC message in the F1AP message.

303: The IAB node 2 maps, based on a signaling type of a signaling message, the signaling message to a transmission channel corresponding to the signaling message, and sends the signaling message to the IAB node 1.

In this embodiment, the signaling type of the signaling message includes an F1AP message related to an access terminal or an F1AP message unrelated to the access terminal. The F1AP message related to the access terminal may be a UE-associated F1AP message, and the F1AP message unrelated to the access terminal may be a non-UE-associated F1AP message. Optionally, the signaling type of the signaling message further includes an SRB bearer type corresponding to an RRC message carried in the UE-associated F1AP message, for example, the SRB 0, the SRB 1, or the SRB 2.

The signaling message sent by the IAB node 2 to the IAB node 1 includes the following several types:
  an RRC message of an IAB node 2 MT;
  a UE-associated F1AP message of the IAB node 2 DU; and/or
  a non-UE-associated F1AP message of the IAB node 2 DU.

For example, an RRC message of the UE may be carried in the UE-associated F1AP message of the IAB node 2 DU.

Manner 1: One-to-One Mapping Manner

The RRC message of the IAB node 2 MT is mapped to a first transmission channel and sent to the IAB node 1. For example, the first transmission channel may be the SRB 0, the SRB 1, or the SRB 2.

The UE-associated F1AP message of the IAB node 2 DU is mapped to a second transmission channel and sent to the IAB node 1. For example, the second transmission channel may be a newly defined SRB (different from an existing SRB 0/SRB 1/SRB 2/SRB 3), or may be an RLC channel. Optionally, UE-associated F1AP messages that carry RRC messages having different priorities each may be mapped to an independent transmission channel and sent to the IAB node 1.

The non-UE-associated F1AP message of the IAB node 2 DU is mapped to a third transmission channel and sent to the IAB node 1. For example, the third transmission channel may be a newly defined SRB (different from an existing SRB 0/SRB 1/SRB 2/SRB 3), or may be an RLC channel.

Manner 2: Many-to-One Mapping Manner

UE-associated F1AP messages that carry RRC messages having a same priority are mapped to a same transmission channel and sent to the IAB node 1. For example, an RRC message 1 of the UE is carried in a UE-associated F1AP message 1 of the IAB node 2 DU. If an RRC message 1 of the IAB node 2 MT and the RRC message 1 of the UE have a same priority (for example, these RRC messages are carried on the SRB 1 for transmission), the RRC message 1 of the IAB node 2 MT and the UE-associated F1AP message 1 of the IAB node 2 DU are mapped to a same transmission channel.

For example, the transmission channel may be a newly defined SRB (different from an existing SRB 0/SRB 1/SRB 2/SRB 3), the existing SRB (SRB 0/SRB 1/SRB 2), an RLC channel corresponding to the existing SRB, or another RLC channel.

304: The IAB node 1 encapsulates the RRC message of the IAB node 2 MT in a UE-associated F1AP message of an IAB node 1 DU.

In this embodiment, because the RRC message of the IAB node 2 MT is an RRC message sent by the IAB node 2 MT to the IAB donor CU, the RRC message of the IAB node 2 MT needs to pass through the IAB node 1 and the IAB donor DU in sequence. The IAB node 1 DU generates the UE-associated F1AP message, and encapsulates the received RRC message of the IAB node 2 MT in the F1AP message.

305: The IAB node 1 maps, based on a signaling type of a signaling message, the signaling message to a transmission channel corresponding to the signaling message, and sends the signaling message to the IAB donor DU.

In this embodiment, the signaling message sent by the IAB node 1 to the IAB donor DU includes the following several types:
  an RRC message of an IAB node 1 MT;
  a UE-associated F1AP message of the IAB node 1 DU;
  a non-UE-associated F1AP message of the IAB node 1 DU;
  a UE-associated F1AP message of the IAB node 2 DU; and/or
  a non-UE-associated F1AP message of the IAB node 2 DU.

For example, the RRC message of the IAB node 2 MT may be carried in the UE-associated F1AP message of the IAB node 1 DU, and the RRC message of the UE may be carried in the UE-associated F1AP message of the IAB node 2 DU.

Several mapping manners are used for the foregoing signaling messages of different signaling types.

Manner 1: One-to-One Mapping Manner

The RRC message of the IAB node 1 MT is mapped to a first transmission channel and sent to the IAB donor DU. For example, the first transmission channel may be the SRB 0, the SRB 1, or the SRB 2.

The UE-associated F1AP message of the IAB node 1 DU is mapped to a second transmission channel and sent to the IAB donor DU. For example, the second transmission channel may be a newly defined SRB (different from an existing SRB 0/SRB 1/SRB 2/SRB 3), or may be an RLC channel.

The non-UE-associated F1AP message of the IAB node 1 DU is mapped to a third transmission channel and sent to the IAB donor DU. For example, the third transmission channel may be a newly defined SRB (different from an existing SRB 0/SRB 1/SRB 2/SRB 3), or may be an RLC channel.

The UE-associated F1AP message of the IAB node 2 DU is mapped to a fourth transmission channel and sent to the IAB donor DU. For example, the fourth transmission channel may be a newly defined SRB (different from an existing SRB 0/SRB 1/SRB 2/SRB 3), or may be an RLC channel.

The non-UE-associated F1AP message of the IAB node 2 DU is mapped to a fifth transmission channel and sent to the IAB donor DU. For example, the fifth transmission channel may be a newly defined SRB (different from an existing SRB 0/SRB 1/SRB 2/SRB 3), or may be an RLC channel.

Manner 2: Many-to-One Mapping Manner

The RRC message of the IAB node 1 MT is mapped to a first transmission channel and sent to the IAB donor DU. For example, the first transmission channel may be the SRB 0, the SRB 1, or the SRB 2.

The UE-associated F1AP message of the IAB node 1 DU and the UE-associated F1AP message of the IAB node 2 DU are mapped to a second transmission channel and sent to the IAB donor DU. For example, the second transmission channel may be a newly defined SRB (different from an existing SRB 0/SRB 1/SRB 2/SRB 3), or may be an RLC channel.

The non-UE-associated F1AP message of the IAB node 1 DU and the non-UE-associated F1AP message of the IAB node 2 DU are mapped to a third transmission channel and sent to the IAB donor DU. For example, the third transmission channel may be a newly defined SRB (different from an existing SRB 0/SRB 1/SRB 2/SRB 3), or may be an RLC channel.

Optionally, an RRC message may be carried in the UE-associated F1AP message. If the one-to-one mapping manner is used, UE-associated F1AP messages that carry RRC messages having different priorities each are mapped to an independent transmission channel and sent to the IAB donor DU.

If the many-to-one mapping manner is used, UE-associated F1AP messages that carry RRC messages having a same priority are mapped to a same transmission channel and sent to the IAB donor DU. For example, an RRC message 1 of the IAB node 2 MT is carried in a UE-associated F1AP message 1 of the IAB node 1 DU, an RRC message 2 of the IAB node 2 MT is carried in a UE-associated F1AP message 2 of the IAB node 1 DU, an RRC message 1 of the UE is carried in a UE-associated F1AP message 1 of the IAB node 2 DU, and an RRC message 2 of the UE is carried in the UE-associated F1AP message 1 of the IAB node 2 DU. If the RRC message 1 of the IAB node 2 MT and the RRC message 1 of the UE have a same priority (for example, these RRC messages are carried on the SRB 1 for transmission), and the RRC message 2 of the IAB node 2 MT and the RRC message 2 of the UE have a same priority (for example, these RRC messages are carried on the SRB 2 for transmission), the UE-associated F1AP message 1 of the IAB node 1 DU and the UE-associated F1AP message 1 of the IAB node 2 DU are mapped to a transmission channel, and the UE-associated F1AP message 2 of the IAB node 1 DU and the UE-associated F1AP message 2 of the IAB node 2 DU are mapped to another transmission channel.

If the many-to-one mapping manner is used, optionally, UE-associated F1AP messages that carry RRC messages having a same priority may alternatively be mapped to a same transmission channel and sent to the IAB donor DU. For example, an RRC message 1 of the IAB node 2 MT is carried in a UE-associated F1AP message 1 of the IAB node 1 DU, and an RRC message 1 of the UE is carried in a UE-associated F1AP message 1 of the IAB node 2 DU. If an RRC message 1 of the IAB node 1 MT, the RRC message 1 of the IAB node 2 MT, and the RRC message 1 of the UE have a same priority (for example, these RRC messages are carried on the SRB 1 for transmission), the RRC message 1 of the IAB node 1 MT, the UE-associated F1AP message 1 of the IAB node 1 DU, and the UE-associated F1AP message 1 of the IAB node 2 DU are mapped to a same transmission channel.

For example, the transmission channel may be a newly defined SRB (different from an existing SRB 0/SRB 1/SRB 2/SRB 3), the existing SRB (SRB 0/SRB 1/SRB 2), an RLC channel corresponding to the existing SRB, or another RLC channel.

306: The IAB donor DU sends, to the IAB donor CU, signaling received from the IAB node 1.

In this embodiment, the signaling message sent by the IAB donor DU to the IAB donor CU includes the following several types:

an RRC message of the IAB node 1 MT;
a UE-associated F1AP message of the IAB node 1 DU;
a non-UE-associated F1AP message of the IAB node 1 DU;
a UE-associated F1AP message of the IAB node 2 DU; and/or
a non-UE-associated F1AP message of the IAB node 2 DU.

For example, the RRC message of the IAB node 2 MT may be carried in the UE-associated F1AP message of the IAB node 1 DU, and the RRC message of the UE may be carried in the UE-associated F1AP message of the IAB node 2 DU.

The foregoing two embodiments respectively describe the technical solutions provided in this application from a perspective of downlink and a perspective of uplink. For example, for an uplink signaling flow direction and a downlink signaling flow direction, refer to FIG. 1d. When signaling messages of each hop are sent, signaling messages of different signaling types are mapped to corresponding transmission channels based on different signaling message types and sent to a next-hop node, so that priorities of different signaling messages can be distinguished based on different transmission channels.

It should be noted that, optionally, two network elements: a distributed unit (DU) and a mobile terminal (MT) included in the IAB node may alternatively be two independent devices. This is not limited in this embodiment of this application. Signaling transmission processes of the DU and the MT in the foregoing working process each are classified into two cases: uplink sending and downlink sending, which are separately described as follows.

1. Downlink Sending

For downlink information, the IAB node DU may perform next-hop mapping based on a previous-hop transmission channel, or may perform next-hop mapping based on a signaling type indicated by the IAB node MT. For ease of understanding, the following separately describes the two cases.

1. The IAB node DU performs next-hop mapping based on the previous-hop transmission channel.

Figure 4:
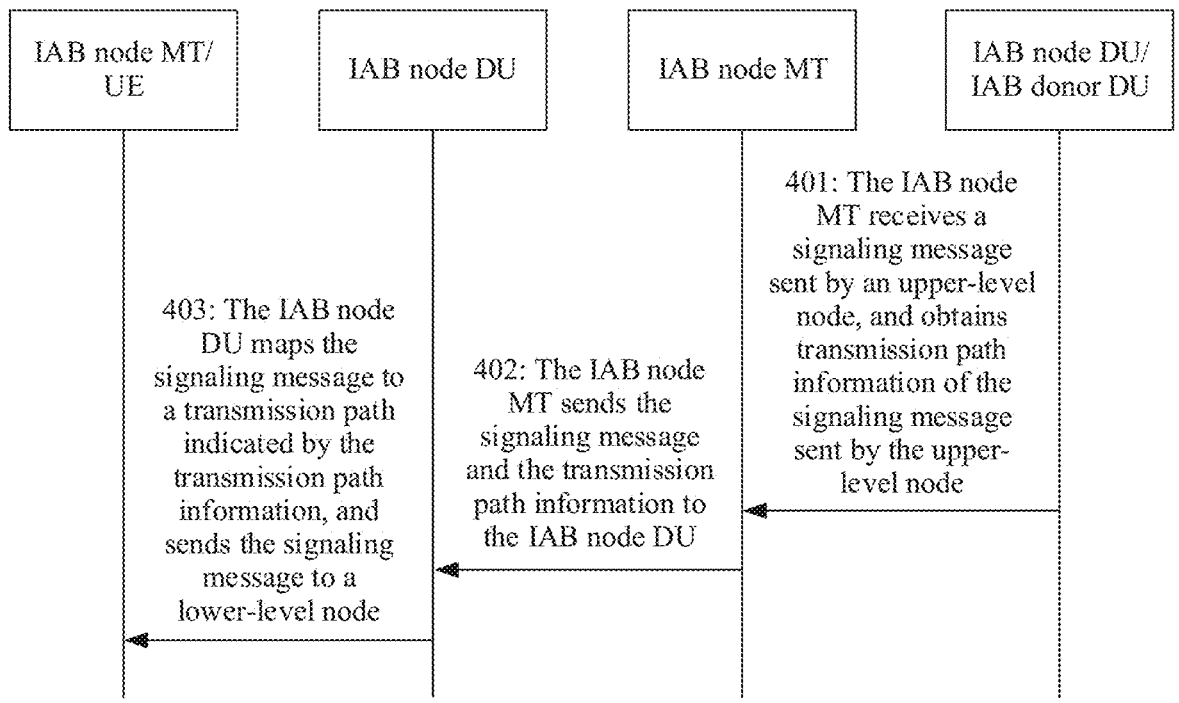
FIG. 4 is a schematic diagram of another embodiment of a mapping method according to an embodiment of this application.

Refer to FIG. 4. That the IAB node DU performs next-hop mapping based on the previous-hop transmission channel includes the following steps.

401: The IAB node MT receives a signaling message sent by an upper-level node, and obtains transmission channel information of the signaling message sent by the upper-level node.

In this embodiment, the upper-level node is a parent node of the IAB node MT. The transmission channel information is used to indicate a previous-hop transmission channel for sending the signaling message, and may be a logical channel identifier LCID corresponding to the transmission channel.

402: The IAB node MT sends the signaling message and the transmission channel information to the IAB node DU.

In this embodiment, the transmission channel information is used to indicate a transmission channel through which the IAB node MT receives the signaling message. The transmission channel may be a transmission channel of an SRB type, or may be a BH RLC channel.

403: The IAB node DU maps the signaling message to a transmission channel indicated by the transmission channel information, and sends the signaling message to a lower-level node.

In this embodiment, the lower-level node is a child node of the IAB node DU. The IAB node DU knows, based on the transmission channel information, a transmission channel through which the IAB node MT receives the signaling message, and sends the signaling message to the lower-level node through a same transmission channel, to ensure a correspondence between a signaling message and a transmission channel. For example, the IAB node DU may map a signaling message received from a previous-hop BH RLC channel x to a next-hop BH RLC channel x for transmission, or may map a signaling message received from a previous-hop BH RLC channel y to a next-hop BH RLC channel y for transmission.

Alternatively, the IAB node DU maps, based on the transmission channel information and a mapping relationship that is previously obtained from an IAB donor CU, for example, a mapping relationship, obtained by the IAB node DU from the IAB donor CU, between a previous-hop transmission channel and a next-hop transmission channel that are used for the signaling message, for example, a mapping relationship between a previous-hop LCID and a next-hop LCID, the signaling message to a transmission channel corresponding to a corresponding next-hop LCID, and sends the signaling message to the lower-level node.

In this embodiment, the IAB node DU does not need to know a signaling type of the signaling message, but only needs to map the signaling message to a corresponding transmission channel based on information, about a previous-hop transmission channel, indicated by the IAB node MT and send the signaling message to a lower-level node.

2. The IAB node DU performs next-hop mapping based on the signaling type indicated by the IAB node MT.

Figure 5:
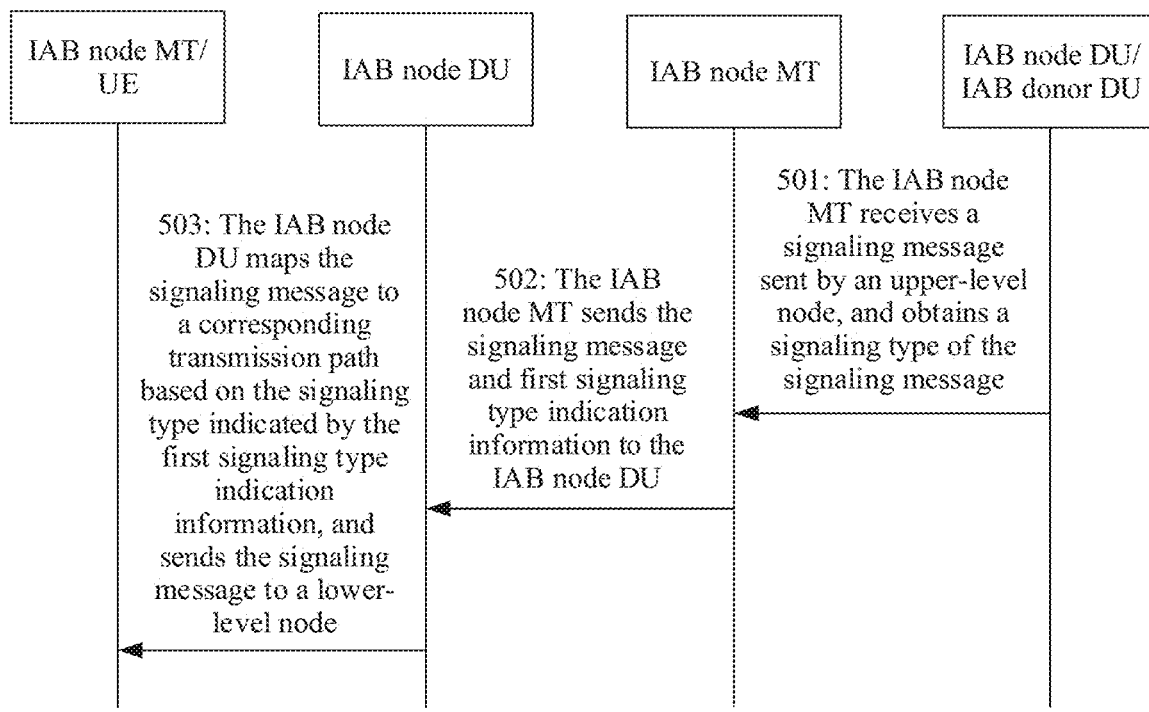
FIG. 5 is a schematic diagram of another embodiment of a mapping method according to an embodiment of this application.

Refer to FIG. 5. That the IAB node DU performs next-hop mapping based on the signaling type indicated by the IAB node MT includes the following steps.

501: The IAB node MT receives a signaling message sent by an upper-level node, and obtains a signaling type of the signaling message.

In this embodiment, the upper-level node is a parent node of the IAB node MT. The upper-level node may send the signaling type of the signaling message through an adaptation layer to the IAB node MT. The signaling type may be a UE-associated F1AP message or a non-UE-associated F1AP message.

Optionally, the signaling type may further indicate an SRB bearer type corresponding to an RRC message carried in an F1AP message of a UE-associated type, for example, an SRB 0, an SRB 1, or an SRB 2.

502: The IAB node MT sends the signaling message and first signaling type indication information to the IAB node DU.

In this embodiment, the first signaling type indication information is used to indicate the signaling type of the signaling message. The signaling type may be an F1AP message of a UE-associated type or an F1AP message of a non-UE-associated type.

Optionally, the signaling type may further indicate an SRB bearer type corresponding to an RRC message carried in an F1AP message of a UE-associated type, for example, an SRB 0, an SRB 1, or an SRB 2.

503: The IAB node DU maps the signaling message to a corresponding transmission channel based on the signaling type indicated by the first signaling type indication information, and sends the signaling message to a lower-level node.

In this embodiment, the lower-level node is a child node of the IAB node DU. The IAB node DU obtains the signaling type of the received signaling message based on the first signaling type indication information. In this embodiment, when a transmission channel is created, the IAB node DU configures corresponding transmission channels for different types of signaling, so that the IAB node DU knows a correspondence between a signaling type and a transmission channel. In this way, the IAB node DU may map the signaling message to the corresponding transmission channel based on the first signaling type indication information sent by the IAB node MT, and send the signaling message to a next node. For a specific sending manner, refer to step 204. Details are not described herein again.

2. Uplink Sending

For uplink sending, the IAB node MT maps the signaling message to the corresponding transmission channel based on first signaling type indication information sent by the IAB node DU, and sends the signaling message to a next-hop node. Alternatively, the IAB node MT maps the signaling message to the corresponding transmission channel based on first signaling type indication information sent by an upper-layer protocol stack, and sends the signaling message to a next-hop node. For example, the first signaling type indication information is used to indicate a signaling type of the signaling message. For ease of understanding, the following describes this case in detail.

Figure 6:
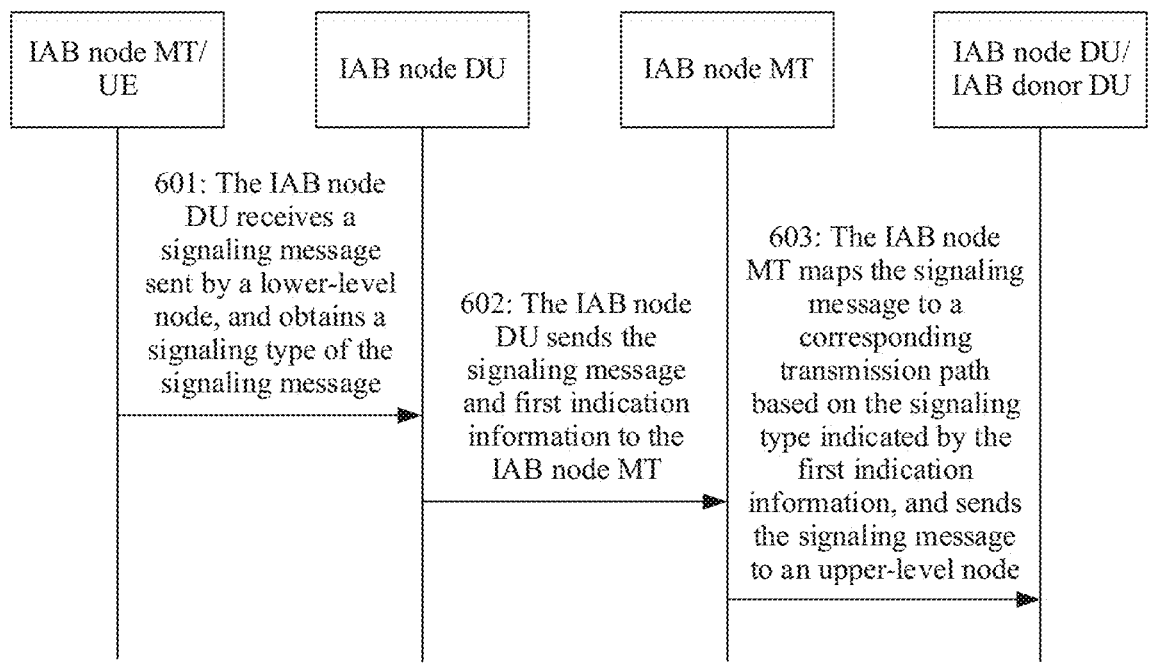
FIG. 6 is a schematic diagram of another embodiment of a mapping method according to an embodiment of this application.

Refer to FIG. 6. Signal exchange between the IAB node MT and the IAB node DU during uplink sending includes the following steps.

601: The IAB node DU receives a signaling message sent by a lower-level node, and obtains a signaling type of the signaling message.

In this embodiment, the lower-level node is a child node of the IAB node DU. Because uplink sending is performed, the IAB node DU receives the signaling message sent by the lower-level node.

Optionally, the IAB node DU receives, from a transmission channel, the signaling message sent by the lower-level node, and learns of, based on an LCID corresponding to the transmission channel, a signaling type of the signaling message transmitted on the transmission channel.

Optionally, the IAB node DU receives an indication, of the signaling type of the signaling message, sent by the lower-level node in an adaptation layer.

The signaling type may be a UE-associated F1AP message or a non-UE-associated F1AP message.

Optionally, the signaling type may further indicate an SRB bearer type corresponding to an RRC message carried in an F1AP message of a UE-associated type, for example, an SRB 0, an SRB 1, or an SRB 2.

602: The IAB node DU sends the signaling message and first indication information to the IAB node MT.

In this embodiment, the first indication information is used to indicate a type of the F1AP message, for example, a UE-associated type or a non-UE-associated type.

Optionally, the first indication information may further indicate an SRB bearer type corresponding to an RRC message carried in an F1AP message of a UE, associated type, for example, an SRB 0, an SRB 1, or an SRB 2.

603: The IAB node MT maps the signaling message to a corresponding transmission channel based on the signaling type indicated by the first indication information, and sends the signaling message to an upper-level node.

In this embodiment, the IAB node MT learns of the signaling type of the signaling message based on the first indication information. In addition, when a transmission channel is created, the IAB node MT may receive a correspondence between a signaling type and a transmission channel from the IAB donor CU. In this way, the IAB node MT may map the signaling message to the corresponding transmission channel based on the correspondence, and send the signaling message to the upper-level node.

In addition, the IAB node MT may further perform previous-hop mapping based on a next-hop transmission channel. For example, the IAB node MT sends the signaling message to a parent node of the IAB node MT through a transmission channel having an LCID that is the same as that of a transmission channel that is between the IAB node DU and a child node of the IAB node DU and through which the signaling message is received. Alternatively, the IAB node MT may map, based on a mapping relationship obtained from the IAB donor CU, for example, a mapping relationship between a next-hop transmission channel and a previous-hop transmission channel that are used for the signaling message, for example, a mapping relationship between a previous-hop LCID and a next-hop LCID, the signaling message to a transmission channel corresponding to a corresponding previous-hop LCID, and send the signaling message to the upper-level node. This process is similar to the process in step 403. Details are not described herein again.

Figure 7A:
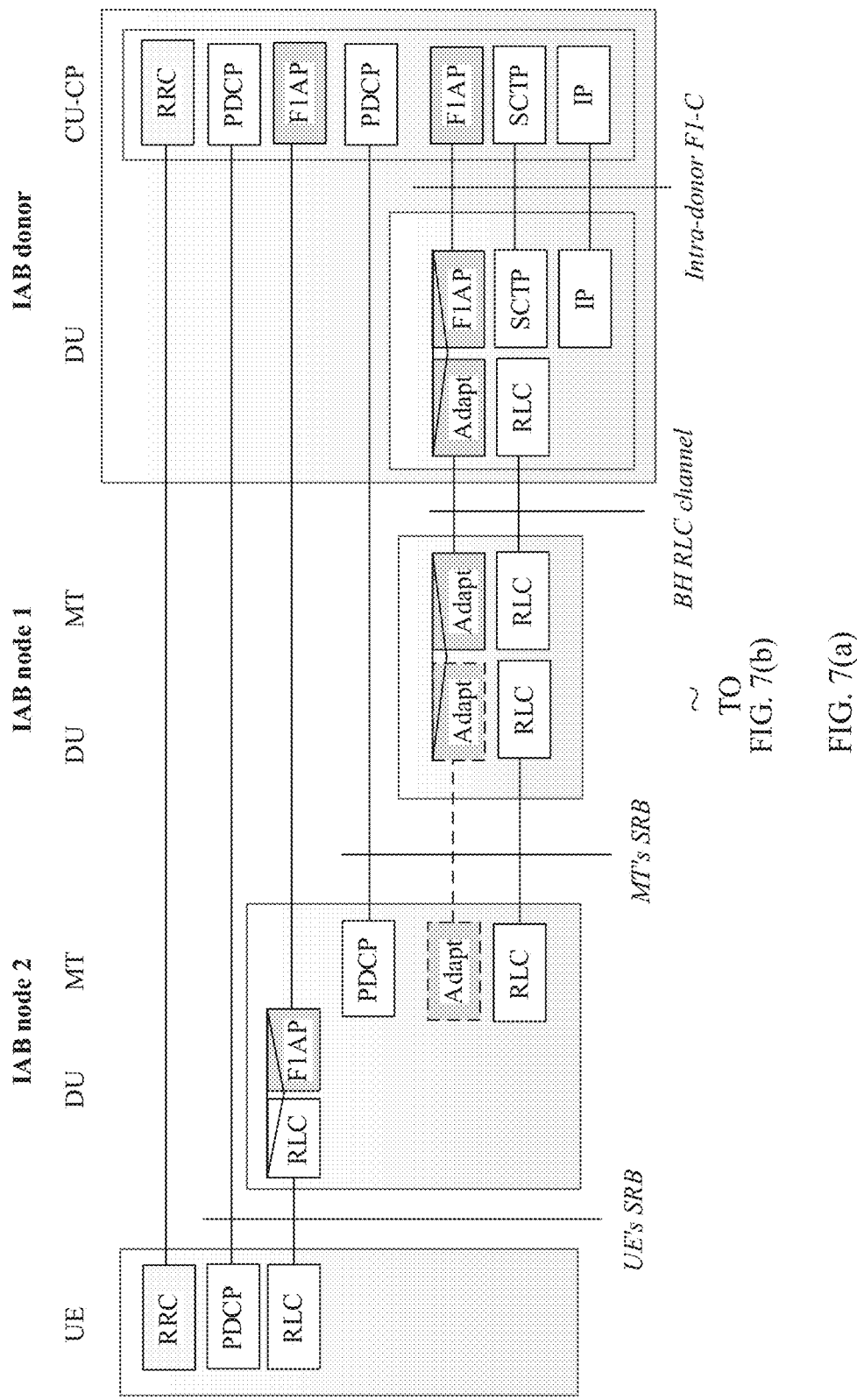
FIG. 7(a) to FIG. 7(c) are a schematic diagram of sending a data packet in an alternative 2 architecture according to an embodiment of this application.
Figure 7B:
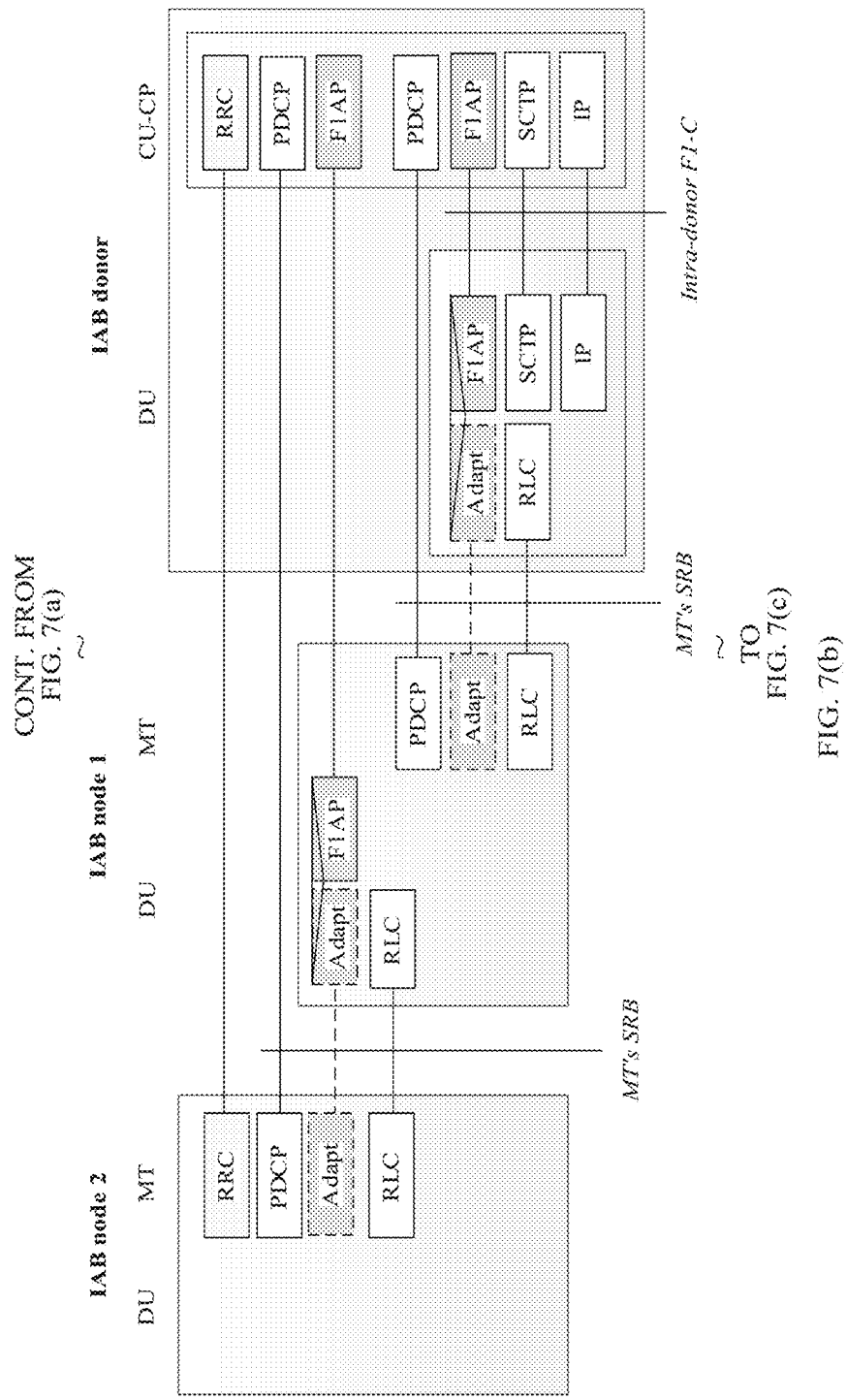
Figure 7C:
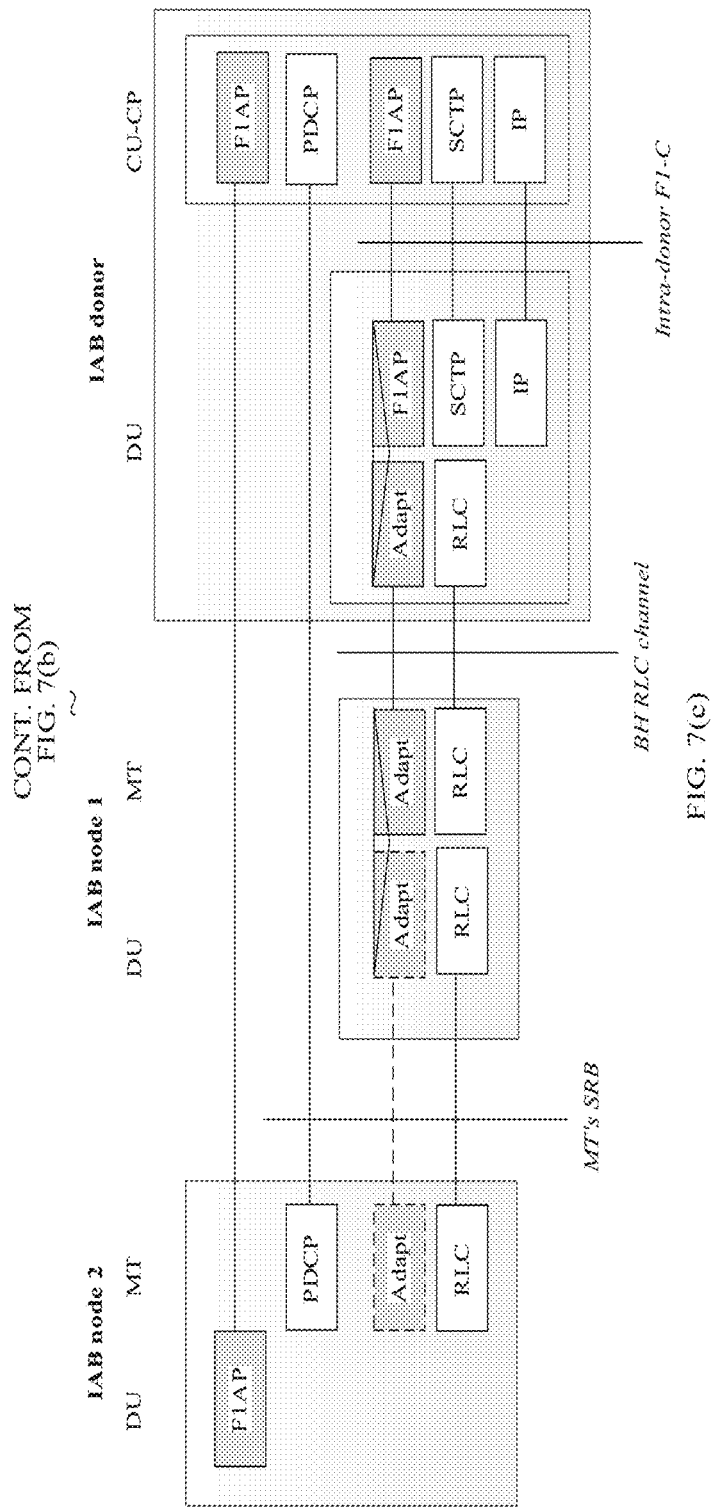
Figure 8B:
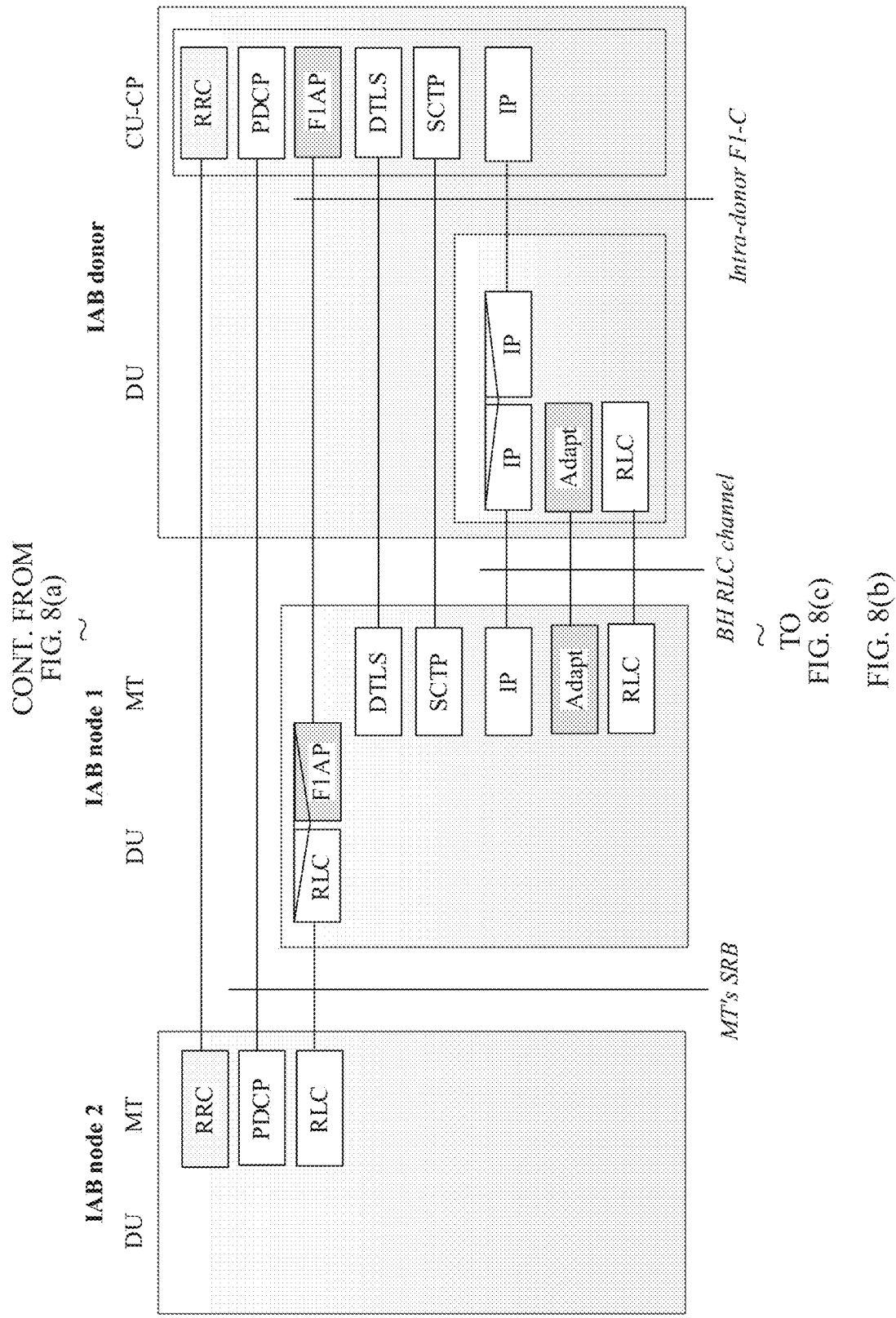
Figure 8C:
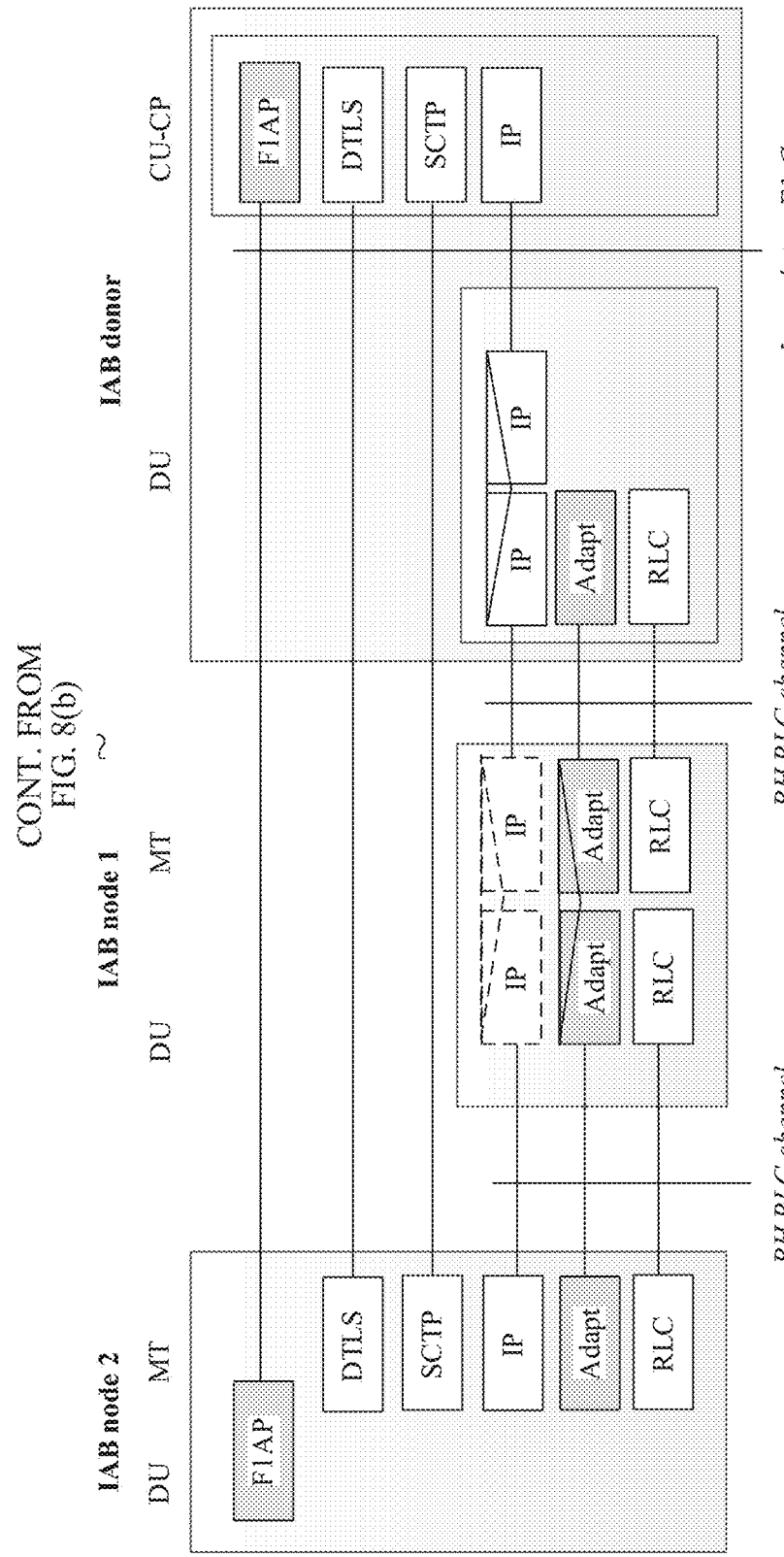

It should be noted that, for the steps of signaling transmission between the IAB donor DU and the IAB donor CU in step 202 and step 306, currently, two control plane protocol stack architectures, namely, an alternative 2 architecture and an alternative 4 architecture, are agreed in IAB SI. For example, the alternative 2 architecture is shown in FIG. 7(*a*) to FIG. 7(*c*). An RRC message of UE is encapsulated in an F1AP message of an IAB node 2 DU for transmission. An RRC message of an IAB node 2 MT is encapsulated in an F1AP message of an IAB node 1 DU for transmission. A PDCP layer is used for security protection of both the F1AP message of the IAB node 2 DU and the F1AP message of the IAB node 1 DU. All signaling is carried in an F1AP message between an IAB donor DU and an IAB donor CU in an IAB donor for transmission. The alternative 4 architecture is shown in FIG. 8(*a*) to FIG. 8(*c*). A difference between the control plane protocol stack architectures alternative 4 and alternative 2 is that DTLS is used for security protection of both the F1AP message of the IAB node 2 DU and the F1AP message of the IAB node 1 DU. Route transmission of all signaling is performed through IP in an IAB donor.

That is, in the alternative 2 architecture, an F1AP message is used for signal transmission between the IAB donor DU and the IAB donor CU. In the alternative 4 architecture, IP is used for route transmission between the IAB donor DU and the IAB donor CU.

For the foregoing two different architectures, there are different detailed execution manners for step 202, which are separately described as follows.

1. Manner of Signal Transmission Between the IAB Donor DU and the IAB Donor CU in the Alternative 2 Architecture

202A1: The IAB donor CU sends the F1AP message including the first indication information to the IAB donor DU.

In this embodiment, because the F1AP message is used for signal transmission between the IAB donor DU and the IAB donor CU in the alternative 2 architecture, the first indication information is carried in the F1AP message. For another working manner, refer to steps 201 to 204. Details are not described herein again.

Optionally, the second indication information is also carried in the F1AP message for sending. For another working manner, refer to steps 201 to 204. Details are not described herein again.

2. Manner of Signal Transmission Between the IAB Donor DU and the IAB Donor CU in the Alternative 4 Architecture

202B1: The IAB donor CU sends a differentiated services code point DSCP, a flow label value, or another field, in an IP header field, including the first indication information to the IAB donor DU.

In this embodiment, because IP is used for route transmission between the IAB donor DU and the IAB donor CU in the alternative 4 architecture, the IAB donor CU includes the first indication information in the IP header field.

Correspondingly, because the foregoing difference exists between the alternative 4 architecture and the alternative 2 architecture, working manners of the first indication information are correspondingly different and specifically include two implementations: 1. The IAB donor CU maps the signaling type to a corresponding DSCP or a corresponding flow label value, and sends an IP header field including the corresponding DSCP or the corresponding flow label value to the IAB donor DU. 2. The IAB donor CU determines, based on the signaling type, a transmission channel for sending the signaling message, and sends an IP header field including transmission channel information of the transmission channel to the IAB donor DU. For ease of understanding, the following specifically describes the foregoing two implementations.

1. The IAB donor CU maps the signaling type to a corresponding DSCP or a corresponding flow label value, and sends an IP header field including the corresponding DSCP or the corresponding flow label value to the IAB donor DU.

In this embodiment, the first implementation may be further subdivided into two different working manners: (1) The IAB donor DU obtains a first mapping relationship between a DSCP/flow label value and a transmission channel from the IAB donor CU. (2) The IAB donor DU alternatively obtains a second mapping relationship between a signaling type and a transmission channel from the IAB donor CU. The following describes the two implementations.

(1) The IAB donor DU obtains a first mapping relationship between a DSCP/flow label value and a transmission channel from the IAB donor CU.

In this implementation, the IAB donor DU obtains a correspondence between a DSCP/flow label value and a transmission channel between the IAB donor DU and the IAB node from the IAB donor CU, for example, obtains the DSCP/flow label value and an LCID that corresponds to the transmission channel. For example, the DSCP/flow label value is in a one-to-one correspondence with the LCID.

After obtaining the DSCP/flow label value from the IP header field, the IAB donor DU maps, based on the correspondence previously obtained from the IAB donor CU, signaling indicated by the DSCP/flow label value to the transmission channel corresponding to the LCID, and sends the signaling to the IAB node. The transmission channel may be an SRB, or may be an RLC channel.

(2) The IAB donor DU obtains a second mapping relationship between a signaling type and a transmission channel from the IAB donor CU.

In this implementation, the IAB donor DU obtains a correspondence between a DSCP/flow label value and a signaling type of a signaling message from the IAB donor CU.

The IAB donor DU may map, based on the correspondence, signaling indicated by the DSCP/flow label value to a corresponding transmission channel, and send the signaling to the IAB node. The transmission channel may be an SRB, or may be an RLC channel, in a transmission channel establishment process, the IAB donor DU establishes corresponding transmission channels for different types of signaling, and allocates different logical channels. Therefore, the IAB donor DU may learn of the correspondence between a signaling type and a transmission channel.

2. The IAB donor CU determines, based on the signaling type, a transmission channel for sending the signaling message, and sends an IP header field including transmission channel information of the transmission channel to the IAB donor DU.

In this embodiment, the IAB donor CU determines, based on the signaling type, the transmission channel for sending the signaling message. For example, the signaling type may be an F1AP message of a UE-associated type or an F1AP message of a non-UE-associated type. Optionally, the signaling type may further indicate an SRB bearer type (for example, an SRB 0, an SRB 1, or an SRB 2) corresponding to an RRC message carried in the UE-associated F1AP message. The transmission channel may be an SRB bearer or a BH RLC channel. The transmission channel information may be a logical channel identifier LCID corresponding to the transmission channel.

In this embodiment, in the two different architectures alternative 2 and alternative 4, different sending manners are used to implement downlink signal transmission between the IAB donor CU and the IAB donor DU.

For uplink signal transmission, in the two different architectures alternative 2 and alternative 4, an access IAB node performs bearer mapping of uplink signaling. Details are as follows:

1. Manner of Uplink Signaling Transmission Between the IAB Node 2 and the IAB Node 1 in the Alternative 2 Architecture The IAB node 2 determines a signaling type of a to-be-sent uplink signaling message. The signaling type may be a UE-associated F1AP message or a non-UE-associated F1AP message.

Optionally, the signaling type may further indicate an SRB bearer type corresponding to an RRC message carried in an F1AP message of a UE-associated type, for example, an SRB 0, an SRB 1, or an SRB 2.

The IAB node 2 MT maps, based on indication information sent by the IAB node 2 DU or indication information sent by an upper-layer protocol stack, the to-be-sent uplink signaling message to a corresponding transmission channel, and sends the to-be-sent uplink signaling message to the IAB node 1 DU. The indication information may be indication information of an SRB bearer type, indication information of an SRB bearer+a UE ID, LCID information of a Uu interface, LCID information of a Uu interface+a UE ID, UE bearer ID information, UE bearer ID information+a UE ID, indication information of a signaling type, or indication information of a signaling type+a UE ID.

Optionally, before receiving the indication information, the IAB node 2 MT may further obtain at least one or more of the following mapping relationships from the IAB donor CU to perform mapping of the uplink signaling message:

1. a mapping relationship between an SRB bearer type and a transmission channel;
2. a mapping relationship between an SRB bearer type+a UE ID and a transmission channel;
3. a mapping relationship between an LCID on a Uu interface and a transmission channel;
4. a mapping relationship between an LCID on a Uu interface+a UE ID and a transmission channel;
5. a mapping relationship between a UE bearer ID and a transmission channel;
6. a mapping relationship between a UE bearer ID+a UE ID and a transmission channel;
7. a mapping relationship between different signaling types and a transmission channel; or
8. a mapping relationship between different signaling types+a UE ID and a transmission channel.

For example, the SRB bearer type is an SRB 0/SRB 1/SRB 2/SRB 3; "/" represents "or"; the transmission channel is a transmission channel between the IAB node 2 MT and the IAB node 1 DU, and may be a newly defined SRB bearer or an existing SRB bearer, or may be a BH RLC channel, the SRB bearer may be identified by using the SRB bearer type, and the BH RLC channel may be identified by using a logical channel identifier LCID corresponding to the BH RLC channel; the UE ID is used to uniquely identify a terminal device UE in a cell of the IAB node 2 DU, and may be a C-RNTI, or may be a cell identifier of the IAB node 2 DU+a C-RNTI; the LCID on the Uu interface is a logical channel identifier LCID on an interface between the UE and the IAB node 2 DU; the UE bearer ID is a bearer identifier of the terminal device or a bearer identifier; and the different signaling types are used to indicate signaling types, for example, a UE-associated F1AP message or a non-UE-associated F1AP message.

For example, that the IAB node 2 MT obtains the mapping relationship from the IAB donor CU includes: The IAB node 2 MT obtains the SRB bearer type and the identifier of the BH RLC channel from the IAB donor CU, where the SRB bearer type is in a one-to-one correspondence with the identifier of the BH RLC channel. Alternatively, the IAB node 2 MT obtains the SRB bearer type+the UE ID and the identifier of the BH RLC channel from the IAB donor CU, where the SRB bearer type+the UE ID is in a one-to-one correspondence with the identifier of the BH RLC channel. Alternatively, the IAB node 2 MT obtains the LCID on the Uu interface and the identifier of the BH RLC channel from the IAB donor CU, where the LCID on the Uu interface is in a one-to-one correspondence with the identifier of the BH RLC channel. Alternatively, the IAB node 2 MT obtains the LCID on the Uu interface+the UE ID and the identifier of the BH RLC channel from the IAB donor CU, where the LCID on the Uu interface+the UE is in a one-to-one correspondence with the identifier of the BH RLC channel. Alternatively, the IAB node 2 MT obtains the UE bearer ID and the identifier of the BH channel from the IAB donor CU, where the UE bearer ID is in a one-to-one correspondence with the identifier of the BH RLC channel. Alternatively, the IAB node 2 MT obtains the UE bearer ID+the UE ID and the identifier of the BH RLC channel from the IAB donor CU, where the UE bearer ID+the UE ID is in a one-to-one correspondence with the identifier of the BH RLC channel. Alternatively, the IAB node 2 MT obtains the indication information of the signaling type and the identifier of the BH RLC channel from the IAB donor CU, where signaling indicated by the indication information of the signaling type is in a one-to-one correspondence with the identifier of the BH RLC channel. Alternatively, the IAB node 2 MT obtains the indication information of the signaling type+the UE ID and the identifier of the BH RLC channel from the IAB donor CU, where signaling indicated by the indication information of the signaling type+the UE ID is in a one-to-one correspondence with the identifier of the BH RLC channel.

In this embodiment, the IAB node 2 MT maps the to-be-sent uplink signaling message to the corresponding transmission channel based on the received indication information and the mapping relationship that is previously obtained from the IAB donor CU, and sends the to-be-sent uplink signaling message to the IAB node 1 DU. In addition, the IAB node 2 MT sends the indication information of the signaling type through an adaptation layer to the IAB node 1 DU, where the indication information of the signaling type may explicitly or implicitly indicate a signaling type of to-be-sent uplink data.

For example, the IAB node 2 MT may obtain the mapping relationship from the IAB donor CU by using an RRC message.

In this embodiment, as a possibility implementation, the IAB node 2 DU may obtain the mapping relationship from the IAB donor CU by using an F1AP message. Then, the IAB node 2 DU determines, based on the mapping relationship, a transmission channel to which to-be-sent uplink signaling is mapped, and sends an identifier of the mapped transmission channel, for example, a logical channel LCID corresponding to the BH RLC channel, through an internal interface to the IAB node 2 MT. The IAB node 2 MT maps, based on the received identifier of the transmission channel, the to-be-sent uplink signaling to the transmission channel corresponding to the identifier of the transmission channel, and sends the to-be-sent uplink signaling to the IAB node 1 DU.

2. Manner of Signal Transmission Between the B Node 2 and the B Node 1 in the Alternative 4 Architecture The IAB node 2 obtains a mapping relationship between a DSCP/flow label and a transmission channel from the IAB donor CU. For example, the transmission channel is a transmission channel between the IAB node 2 MT and the IAB node 1 DU, and may be a newly defined SRB bearer or an existing SRB bearer, or may be a BH RLC channel, the SRB bearer may be identified by using an SRB bearer type, and the BH RLC channel may be identified by using a logical channel identifier LCID corresponding to the BH RLC channel. Specifically, for example, the IAB node 2 MT obtains a DSCP/flow label value and an identifier of a BH RLC channel from the IAB donor CU by using an RRC message, where the DSCP/flow label is in a one-to-one correspondence with the identifier of the BH RLC channel, the BH RLC channel is a BH RLC channel between the IAB node 2 MT and the IAB node 1 DU, and the identifier of the BH RLC channel may be a logical channel identifier LCID corresponding to the BH RLC channel. Alternatively, the IAB node 2 DU obtains a DSCP/flow label and an identifier of a BH RLC channel from the IAB donor CU by using an F1AP message, where the DSCP/flow label is in a one-to-one correspondence with the identifier of the BH RLC channel.

Optionally, the IAB node 2 may further obtain at least one or more of the following mapping relationships from the IAB donor CU:

1. a mapping relationship between an SRB bearer type and a DSCP/flow label;
2. a mapping relationship between an SRB bearer type+a UE ID and a DSCP/flow label;
3. a mapping relationship between an LCID on a Uu interface and a DSCP/flow label;
4. a mapping relationship between an LCID on a Uu interface+a UE ID and a DSCP/flow label;
5. a mapping relationship between a UE bearer ID and a DSCP/flow label;
6. a mapping relationship between a UE bearer ID+a UE ID and a DSCP/flow label;
7. a mapping relationship between different signaling types and a DSCP/flow label; or
8. a mapping relationship between different signaling types+a UE ID and a DSCP/flow label.

For example, the SRB bearer type is an SRB 0/SRB 1/SRB 2/SRB 3; the UE ID is used to uniquely identify a terminal device UE in a cell of the IAB node 2 DU, and may be a C-RNTI, or may be a cell identifier of the IAB node 2 DU+a C-RNTI; the LCID on the Uu interface is a logical channel identifier LCID on an interface between the UE and the IAB node 2 DU; the UE bearer ID is a bearer identifier of the terminal device or a bearer identifier; and the different signaling types are used to indicate signaling types, for example, a UE-associated F1AP message or a non-UE-associated F1AP message.

For example, that the IAB node 2 obtains the mapping relationship from the IAB donor CU may include: The IAB node 2 obtains the SRB bearer type and the DSCP/flow label value from the IAB donor CU, where the SRB bearer type is in a one-to-one correspondence with the DSCP/flow label value. Alternatively, the IAB node 2 obtains the SRB bearer type+the UE ID and the DSCP/flow label value from the IAB donor CU, where the SIB bearer type+the UE ID is in a one-to-one correspondence with the DSCP/flow label value. Alternatively, the IAB node 2 obtains the LCID on the Uu interface and the DSCP/flow label value from the IAB donor CU, where the LCID is in a one-to-one correspondence with the DSCP/flow label. Alternatively, the IAB node 2 obtains the LCID on the Uu interface+the UE ID and the DSCP/flow label value from the IAB donor CU, where the LCID+the UE ID is in a one-to-one correspondence with the DSCP/flow label. Alternatively, the IAB node 2 obtains the UE bearer ID and the DSCP/flow label value from the IAB donor CU, where the UE bearer ID is in a one-to-one correspondence with the DSCP/flow label value. Alternatively, the IAB node 2 obtains the UE bearer ID+the UE ID and the DSCP/flow label value from the IAB donor CU, where the UE bearer ID+the UE ID is in a one-to-one correspondence with the DSCP/flow label value. Alternatively, the IAB node 2 obtains indication information of a signaling type and the DSCP/flow label value from the IAB donor CU, where signaling indicated by the indication information of the signaling type is in a one-to-one correspondence with the DSCP/flow label value. Alternatively, the IAB node 2 obtains indication information of a signaling type+the UE ID and the DSCP/flow label value from the IAB donor CU, where signaling indicated by the indication information of the signaling type+the UE ID is in a one-to-one correspondence with the DSCP/flow label value.

The mapping relationship may be sent by the IAB donor CU to the IAB node 2 DU by using an F1AP message, and the IAB node 2 DU labels a to-be-sent uplink signaling message with a corresponding DSCP/flow label based on the mapping relationship, and includes the to-be-sent uplink signaling message in an IP layer header field for transmission. Alternatively, the mapping relationship may be sent by the IAB donor CU to the IAB node 2 MT by using an RRC message, and the IAB node 2 MT labels a to-be-sent uplink signaling message with a corresponding DSCP/flow label based on the mapping relationship, and includes the to-be-sent uplink signaling message in an IP layer header field for transmission.

In this embodiment, the IAB node 2 labels the to-be-sent uplink signaling message with the corresponding DSCP/flow label, and then performs uplink bearer mapping based on a mapping relationship between a DSCP/flow label configured by the IAB donor and a transmission channel. In another optional implementation, the IAB node 2 DU may obtain the mapping relationship from the IAB donor CU by using the F1AP message. Then, the IAB node 2 DU determines, based on the mapping relationship, a transmission channel to which to-be-sent uplink signaling is mapped, and sends an identifier of the mapped transmission channel, for example, a logical channel LCID corresponding to the BH RLC channel, through an internal interface to the IAB node 2 MT. The IAB node 2 MT maps, based on the received identifier of the transmission channel, the to-be-sent uplink signaling to the transmission channel corresponding to the identifier of the transmission channel, and sends the to-be-sent uplink signaling to the IAB node 1 DU.

In addition, in this embodiment, in an optional implementation, the IAB node 2 sends a signaling type of the to-be-sent uplink signaling through an adaptation layer to the IAB node 1. Then, the IAB node 1 sends the signaling type of the to-be-sent uplink signaling through the adaptation layer to the IAB donor DU. The IAB donor DU may map, based on the indication information of the signaling type carried in the adaptation layer, the signaling message indicated by the indication information of the signaling type to the corresponding DSCP/flow label, and sends the IP layer header field including the signaling message to the IAB donor CU.

Figure 9:
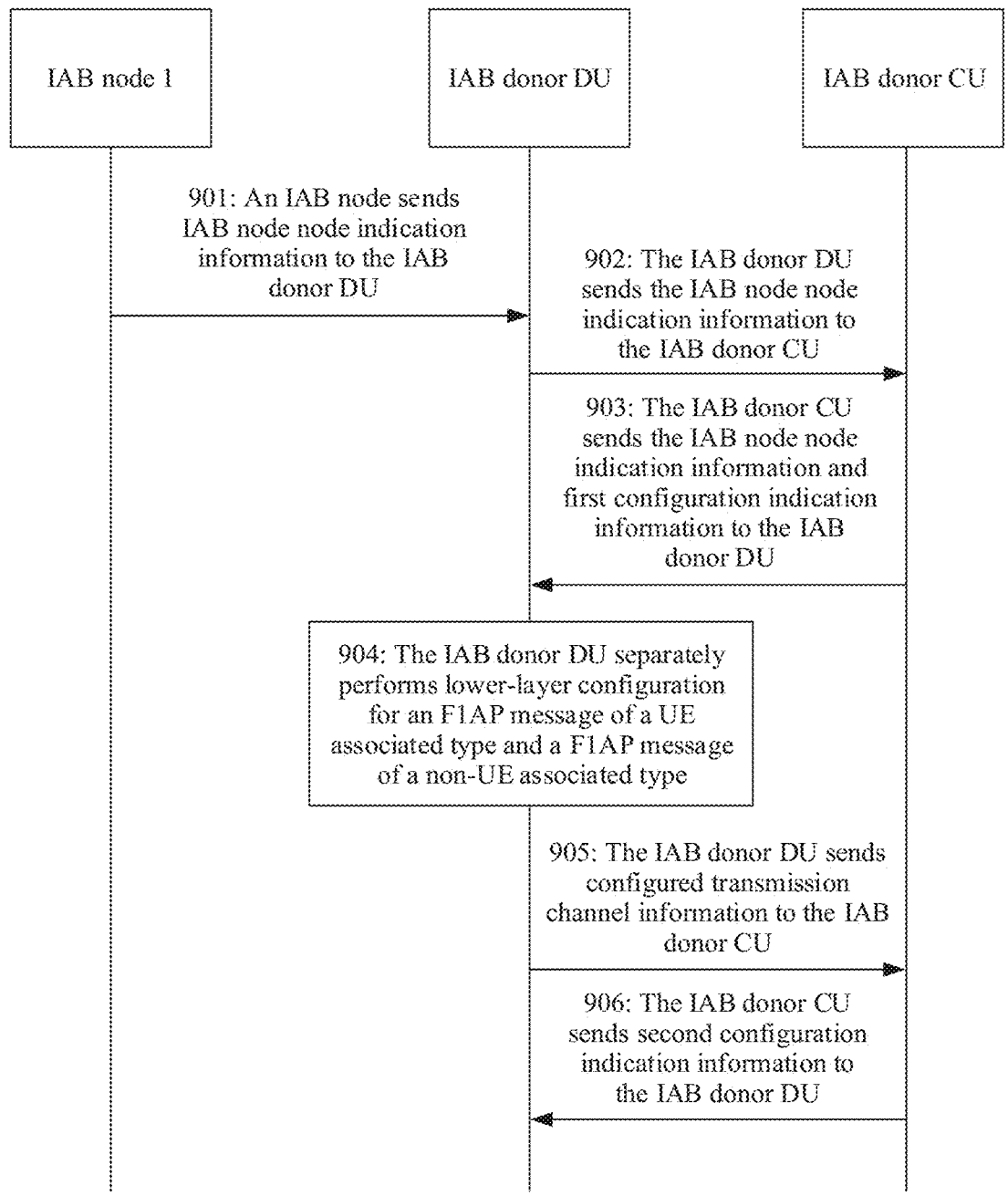
FIG. 9 is a schematic diagram of another embodiment of a mapping method according to an embodiment of this application.

It should be noted that the transmission channel used to transmit the F1AP message of the UE-associated type or the F1AP message of the non-UE-associated type is a newly defined transmission channel. Therefore, after the IAB node accesses a network and before signaling message transmission starts, a corresponding transmission channel needs to be established. For ease of understanding, the following describes a specific manner of establishing a transmission channel. Refer to FIG. 9.

As shown in FIG. 9, the method for establishing a transmission channel in this embodiment of this application includes the following steps.

901: An IAB node sends IAB node indication information to an IAB donor DU.

In this embodiment, the IAB node indication information is used to indicate the IAB donor CU that a device currently accessing a network is an IAB node rather than common user equipment UE, to trigger a procedure of establishing a transmission channel. For example, the IAB node indication information may be carried in an RRC setup request message, or may be carried in an RRC setup complete message.

902: The IAB donor DU sends the IAB node indication information to the IAB donor CU.

In this embodiment, the IAB donor DU sends the IAB node indication information to the IAB donor CU, so that the IAB donor CU triggers a step of establishing the transmission channel. For example, the IAB node indication information may be carried in the RRC setup request message or the RRC setup complete message. The IAB donor DU sends a UL RRC message transfer message including the RRC setup request message or the RRC setup complete message to the IAB donor CU, to send the IAB node indication information.

903: The IAB donor CU sends the IAB node indication information and first configuration indication information to the IAB donor DU.

In this embodiment, in steps 901 and 902, the IAB node indication information is carried in an RRC message, and the IAB donor DU does not have a capability of obtaining the IAB node indication information from the message through parsing. Therefore, the IAB donor DU needs to send the RRC message to the IAB donor CU, the IAB donor CU obtains the IAB node indication information from the RRC message through parsing, and then sends the IAB node indication information to the IAB donor DU by using an F1AP message, and then the IAB donor DU can know that the device currently accessing the network is the IAB node.

The first configuration indication information is used to indicate the IAB donor DU to separately allocate corresponding bearer configuration information to a UE-associated F1AP message and a non-UE-associated F1AP message. For example, the first configuration indication information may be an SRB ID. For example, an SRB x ID is used to carry an F1AP message of a UE-associated type, and an SRB y ID is used to carry an F1AP message of a non-UE-associated type.

Optionally, the first configuration indication information may alternatively be indication information for requesting to establish a corresponding RLC channel for the UE-associated F1AP message and/or the non-UE-associated F1AP message.

904: The IAB donor DU separately performs lower-layer configuration for the F1AP message of the UE-associated type and the F1AP message of the non-UE-associated type.

In this embodiment, the IAB donor DU performs lower-layer configuration for the F1AP message of the UE-associated type and the F1AP message of the non-UE-associated type based on an indication of the first configuration indication information. The lower-layer configuration may be RLC/MAC/logical channel configuration, or the like.

905: The IAB donor DU sends configured transmission channel information to the IAB donor CU.

In this embodiment, the transmission channel information includes a logical channel identifier LCID corresponding to the transmission channel, and is carried in a UE context setup response message and sent by the IAB donor DU to the IAB donor CU.

906: The IAB donor CU sends the configured transmission channel information to the IAB node.

In this embodiment, the IAB donor CU sends the configured transmission channel information to an IAB node MT in the IAB node, to establish a transmission channel that corresponds to a signaling type and that is between the IAB donor DU and the IAB node MT.

Optionally, for the F1AP message of the UE-associated type, the IAB donor DU may further establish different SRBs or BH RLC channels between the IAB node MT and the IAB donor DU based on an SRB type, carried on the Uu interface, of the RRC message carried in the F1AP message, to transmit the F1AP message.

In this embodiment, in a network access procedure of the IAB node, the IAB donor CU indicates the IAB donor DU to establish a transmission channel that corresponds to a signaling message and that is between the IAB donor DU and the IAB node MT, to implement the foregoing mapping method in this application. In addition, in a multi-hop backhaul scenario, the IAB donor CU may further indicate to establish a transmission channel that corresponds to a signaling message and that is between an IAB node 1 DU and an IAB node 2 MT. Details are not described herein again.

It should be noted that a process of establishing the transmission channel is completed before the step of sending the signaling message starts, to save signaling overheads. Optionally, the transmission channel may alternatively not be established in a network access process, and a corresponding transmission channel is established before each signaling message is sent. For example, the IAB donor DU establishes an SRB y or a BH RLC Channel y between the IAB donor DU and the IAB node MT before sending the non-UE-associated F1AP message to the IAB node MT. Any transmission channel established in the foregoing manner falls within the protection scope of this application. A specific sequence of establishing a transmission channel and sending signaling is not limited in this application.

It should be noted that a transmission channel to which the F1AP message of the non-UE-associated type is mapped may alternatively be a default transmission channel or a predefined transmission channel. The transmission channel may be a newly defined SRB bearer or an existing SRB bearer, or may be a BH RLC channel. Fax example, after the IAB node accesses the network and before signaling message transmission starts, a default BH RLC channel needs to be established between the IAB node and a parent node of the IAB node or between the IAB node and a child node of the IAB node. If a to-be-transmitted signaling message is the F1AP message of the non-UE-associated type, the IAB node may map the F1AP message of the non-UE-associated type to the default BH RLC channel, and send the F1AP message of the non-UE-associated type to the parent node of the IAB node (for uplink transmission) or to the child node of the IAB node (for downlink transmission).

It may be understood that, the communications apparatus includes a corresponding hardware structure and/or software module for performing each function to implement the foregoing functions. A person skilled in the art should easily be aware that, in combination with modules and algorithm steps of the examples described in the embodiments disclosed in this specification, this application may be implemented by hardware or a combination of hardware and computer software. Whether a function is performed by hardware or hardware driven by computer software depends on a particular application and a design constraint of the technical solutions. A person skilled in the art may use different methods to implement the described functions for each particular application, but it should not be considered that the implementation goes beyond the scope of this application.

From a perspective of a hardware structure, the mapping method may be implemented by a physical device, or may be jointly implemented by a plurality of physical devices, or may be implemented by a logical function module inside a physical device. This is not specifically limited in the embodiments of this application.

Figure 10:
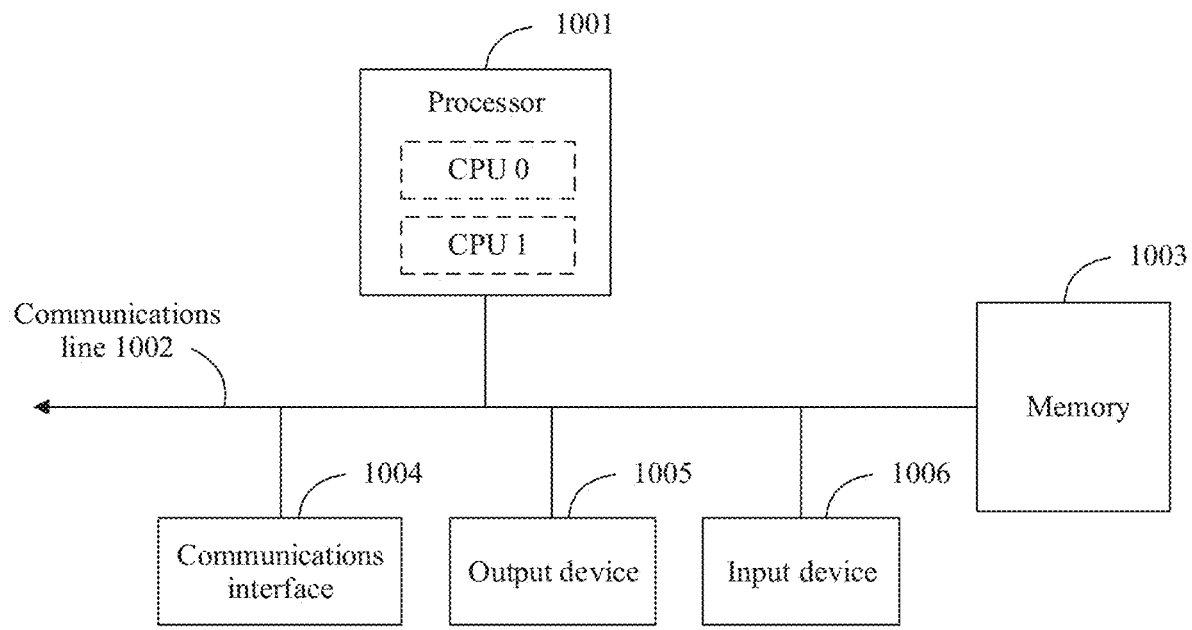
FIG. 10 is a schematic apparatus diagram of a communications apparatus according to an embodiment of this application.

For example, the mapping method may be implemented by a communications apparatus in FIG. 10. FIG. 10 is a schematic diagram of a hardware structure of a communications apparatus according to an embodiment of this application. The communications apparatus may be the IAB donor, the IAB donor DU, the IAB donor CU, the IAB node, the IAB node MT, or the IAB node DU in the embodiments of the present disclosure. The communications apparatus includes at least one processor 1001, a communications line 1002, a memory 1003, and at least one communications interface 1004.

The processor 1001 may be a general-purpose central processing unit (CPU), a microprocessor, an application-specific integrated circuit (ASIC), or one or more integrated circuits configured to control program execution in the solutions of this application.

The communications line 1002 may include a path, to transfer information between the foregoing components.

The communications interface 1004 that uses any apparatus such as a transceiver is configured to communicate with another device or a communications network, for example, the ethernet, a radio access network (RAN), or a wireless local area network (WLAN).

The memory 1003 may be a read-only memory (ROM), another type of static storage device capable of storing static information and instructions, a random access memory (RAM), or another type of dynamic storage device capable of storing information and instructions, or may be an electrically erasable programmable read-only memory (EEPROM), a compact disc read-only memory (CD-ROM), another compact disc storage, an optical disc storage (including a compressed optical disc, a laser disc, an optical disc, a digital versatile disc, a Blu-ray optical disc, and the like), a magnetic disk storage medium, another magnetic storage device, or any other medium capable of including or storing expected program code in a form of instructions or data structures and capable of being accessed by a computer, but is not limited thereto. The memory may exist independently, and is connected to the processor by using the communications line 1002. Alternatively, the memory may be integrated with the processor.

For example, the memory 1003 is configured to store computer-executable instructions for executing the solutions in this application. The processor 1001 is configured to execute the computer-executable instructions stored in the memory 1003, to implement the method provided in the following embodiments of this application.

Optionally, the computer-executable instructions in the embodiments of this application may also be referred to as application program code. This is not specifically limited in this embodiment of this application.

During specific implementation, in an embodiment, the processor 1001 may include one or more CPUs, such as a CPU 0 and a CPU 1 in FIG. 10.

During specific implementation, in an embodiment, the communications apparatus may include a, plurality of processors, such as the processor 1001 in FIG. 10. Each of the processors may be a single-core (single-CPU) processor, or may be a multi-core (multi-CPU) processor. The processor herein may refer to one or more devices, circuits, and/or processing cores configured to process data (for example, computer program instructions).

During specific implementation, in an embodiment, the communications apparatus may further include an output device 1005 and an input device 1006. The output device 1005 communicates with the processor 1001, and may display information in a plurality of manners. For example, the output device 1005 may be a liquid crystal display (LCD), a light emitting diode (LED) display device, a cathode ray tube (CRT) display device, or a projector. The input device 1006 communicates with the processor 1001, and may receive input of a user in a plurality of manners. For example, the input device 1006 may be a mouse, a keyboard, a touchscreen device, or a sensing device.

The foregoing communications apparatus may be a general-purpose device or a special-purpose device. During specific implementation, the communications apparatus may be a server, a wireless terminal device, an embedded device, or a device having a structure similar to that in FIG. 10. A type of the communications apparatus is not limited in this embodiment of this application.

In this embodiment of this application, the communications apparatus may be divided into functional units based on the foregoing method example. For example, each functional unit may be obtained through division based on each corresponding function, or two or more functions may be integrated into one processing unit. The integrated unit may be implemented in a form of hardware, or may be implemented in a form of a software functional unit. It should be noted that, in the embodiments of this application, division into the units is an example, and is merely logical function division. During actual implementation, another division manner may be used.

Figure 11:
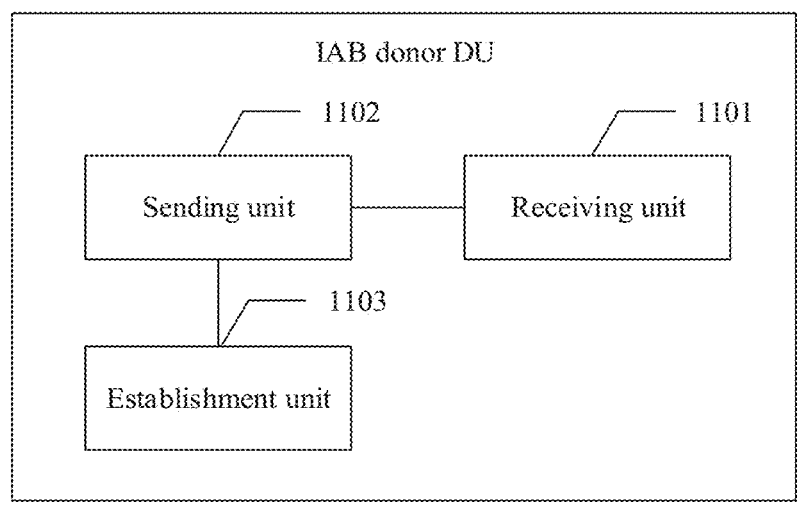
FIG. 11 is a schematic module diagram of an IAB donor DU according to an embodiment of this application.
Figure 12:
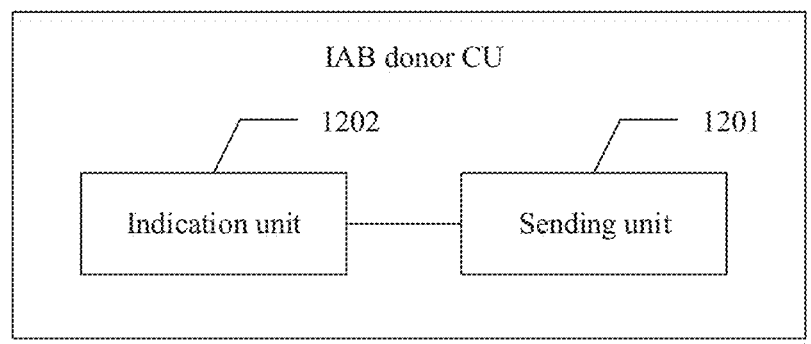
FIG. 12 is a schematic module diagram of an IAB donor CU according to an embodiment of this application.
Figure 13:
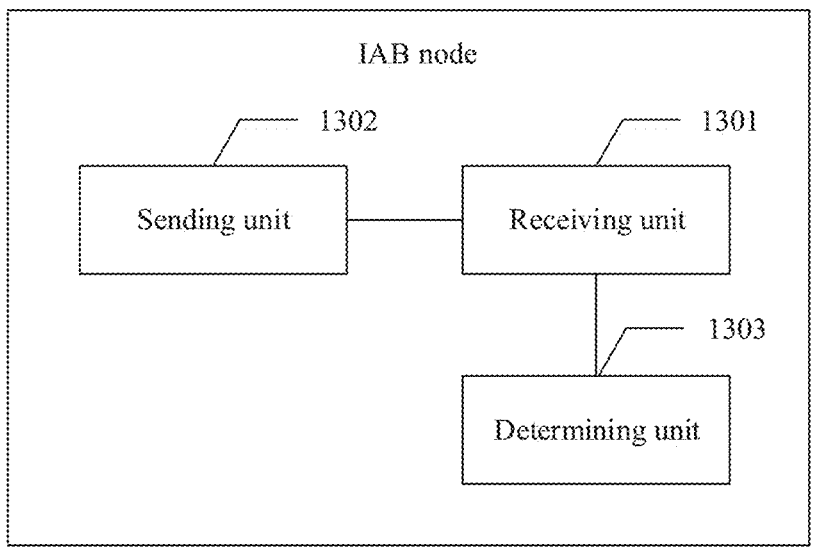
FIG. 13 is a schematic module diagram of an IAB node according to an embodiment of this application.

For example, when the functional units are divided in an integrated manner, FIG. 11 is a schematic structural diagram of an integrated access and backhaul donor distributed unit IAB donor DU; FIG. 12 is a schematic structural diagram of an integrated access and backhaul donor centralized unit IAB donor CU; and FIG. 13 is a schematic structural diagram of an integrated access and backhaul node IAB node.

As shown in FIG. 11, the IAB donor DU provided in this embodiment of this application includes:

a receiving unit 1101, configured to receive a signaling message and first indication information that are sent by an integrated access and backhaul donor centralized unit IAB donor CU, where the first indication information is used to indicate a signaling type of the signaling message; and a sending unit 1102, configured to: map, based on the first indication information received by the receiving unit 1101, the signaling message to a transmission channel corresponding to the signaling message, and send the signaling message to an integrated access and backhaul node IAB node. For example, the signaling type corresponding to the signaling message includes an F1AP message related to an access terminal or an F1AP message unrelated to the access terminal.

Optionally, the first indication information is further used to indicate an SRB bearer type corresponding to an RRC message carried in the F1AP message related to the access terminal. For example, the SRB bearer type is any one of an SRB 0, an SRB 1, or an SRB 2.

Optionally, the receiving unit 1101 is further configured to receive second indication information sent by the IAB donor CU, where the second indication information is used to: when the signaling type of the signaling message is the F1AP message related to the access terminal, indicate an SRB bearer type corresponding to an RRC message carried in the F1AP message related to the access terminal. For example, the SRB bearer type is any one of an SRB 0, an SRB 1, or an SRB 2. Correspondingly, the sending unit 1102 is further configured to: map, based on the second indication information received by the receiving unit 1101, the signaling message to a transmission channel corresponding to the signaling message, and send the signaling message to the IAB node.

Optionally, the sending unit 1102 is further configured to: if the first indication information received by the receiving unit 1101 indicates that the signaling type of the signaling message is the F1AP message related to the access terminal, send, to the IAB node through a first transmission channel, the F1AP message related to the access terminal, where the first transmission channel is a newly defined SRB x or a radio link control channel RLC channel x, for example, x is not 0, 1, 2, 3; or if the first indication information received by the receiving unit 1101 indicates that the signaling type of the signaling message is the F1AP message unrelated to the access terminal, send, to the IAB node through a second transmission channel, the F1AP message unrelated to the access terminal, where the second transmission channel is a newly defined SRB y or an RLC channel y, for example, y is not 0, 1, 2, 3, or x.

Optionally, if the signaling type of the signaling message is the F1AP message related to the access terminal, the sending unit 1102 is configured to: if the first indication information or the second indication information received by the receiving unit 1101 indicates that the SRB bearer type corresponding to the RRC message carried in the F1AP message related to the access terminal is the SRB 0, map the F1AP message related to the access terminal to a third transmission channel, and send the F1AP message related to the access terminal to the IAB node, where the third transmission channel is a newly defined SRB z or a radio link control channel RLC channel z, for example, z is not 0, 1, 2, 3, x, or y; or if the first indication information or the second indication information received by the receiving unit 1101 indicates that the SRB bearer type corresponding to the RRC message carried in the F1AP message related to the access terminal is the SRB 1, map the F1AP message related to the access terminal to a fourth transmission channel, and send the F1AP message related to the access terminal to the IAB node, where the fourth transmission channel is a newly defined SRB m or a radio link control channel RLC channel m, for example, m is not 0, 1, 2, 3, x, y, or z; or if the first indication information or the second indication information received by the receiving unit 1101 indicates that the SRB bearer type corresponding to the RRC message carried in the F1AP message related to the access terminal is the SRB 2, map the F1AP message related to the access terminal to a fifth transmission channel, and send the F1AP message related to the access terminal to the IAB node. Where the fifth transmission channel is a newly defined SRB n or a radio link control channel RLC channel n, for example, n is not 0, 1, 2, 3, x, y, z, or m.

Optionally, the first indication information is carried in an F1AP message; or the first indication information is carried in a differentiated services code point DSCP field or a flow label field in an IP header field.

Optionally, if the first indication information is carried in the DSCP field or the flow label field in the IP header field, the receiving unit 1101 is further configured to: receive an identifier corresponding to a transmission channel between the IAB donor DU and the IAB node and the DSCP or the flow label value that are sent by the IAB donor CU, for example, the DSCP or the flow label value is in a one-to-one correspondence with the identifier corresponding to the transmission channel; or receive the signaling type of the signaling message and the DSCP or the flow label value that are sent by the IAB donor CU, for example, the type of the signaling message is in a one-to-one correspondence with the DSCP or the flow label value.

Optionally, the IAB donor DU further includes an establishment unit 1103, configured to establish a transmission channel that corresponds to the signaling type of the signaling message and that is between the IAB node and the IAB donor DU.

As shown in FIG. 12, the IAB donor CU provided in this embodiment of this application includes:

- a sending unit 1201, configured to send a signaling message and first indication information to an integrated access and backhaul donor distributed unit IAB donor DU, where the first indication information is used to indicate a signaling type of the signaling message. For example, the signaling type corresponding to the signaling message includes an F1AP message related to an access terminal or an F1AP message unrelated to the access terminal.

Optionally, the first indication information is further used to indicate an SRB bearer type corresponding to an RRC message carried in the F1AP message related to the access terminal. For example, the SRB bearer type is any one of an SRB 0, an SRB 1, or an SRB 2.

Optionally, the sending unit 1201 is further configured to send second indication information to the IAB donor DU, where the second indication information is used to: when the signaling type of the signaling message is the F1AP message related to the access terminal, indicate an SRB bearer type corresponding to an RRC message carried in the F1AP message related to the access terminal. For example, the SRB bearer type is any one of an SRB 0, an SRB 1, or an SRB 2.

Optionally, the first indication information is carried in an F1AP message; or the first indication information is carried in a differentiated services code point DSCP field or a flow label field in an IP header field.

Optionally, if the first indication information is carried in the differentiated services code point DSCP field or the flow label field in the IP header field, the sending unit 1201 is further configured to: send an identifier corresponding to a transmission channel between the IAB donor DU and an IAB node and the DSCP or the flow label value to the IAB donor DU, for example, the DSCP or the flow label value is in a one-to-one correspondence with the identifier corresponding to the transmission channel; or send the signaling type of the signaling message and the DSCP or the flow label value to the IAB donor DU, for example, the type of the signaling message is in a one-to-one correspondence with the DSCP or the flow label value.

Optionally, the IAB donor CU further includes an indication unit 1202, configured to indicate the IAB donor DU to establish a transmission channel that corresponds to the signaling type of the signaling message and that is between the IAB node and the IAB donor DU.

As shown in FIG. 13, the IAB node provided in this embodiment of this application includes:

- a receiving unit 1301, configured to receive a signaling message sent by a first node; and
- a sending unit 1302, configured to: map the signaling message received by the receiving unit 1301 to a transmission channel corresponding to the signaling message, and send the signaling message to a second node, for example, the signaling type corresponding to the signaling message includes an F1AP message related to an access terminal or an F1AP message unrelated to the access terminal.

Optionally, the receiving unit 1301 is further configured to obtain an identifier corresponding to the transmission channel that corresponds to the signaling message sent by the first node.

Correspondingly, the IAB node further includes a determining unit 1303, configured to determine, based on the identifier that corresponds to the transmission channel and that is received by the receiving unit 1301, the transmission channel corresponding to the signaling message.

Optionally, the identifier corresponding to the transmission channel is a logical channel identifier LCID corresponding to the transmission channel.

Optionally, the receiving unit 1301 is further configured to obtain, from an adaptation layer, the signaling type corresponding to the signaling message, where the adaptation layer is a protocol layer between the IAB node and the first node.

Optionally, the IAB node includes an IAB node distributed unit DU and an IAB node mobile terminal unit MT.

The receiving unit 1301 is further configured to:

- obtain, from the IAB node DU, the signaling type corresponding to the signaling message; or
- obtain, from an upper-layer protocol stack of the IAB node MT, the signaling type corresponding to the signaling message.

Based on the descriptions of the foregoing implementations, a person skilled in the art may clearly understand that this application may be implemented by software in addition to necessary universal hardware, or certainly may be implemented by dedicated hardware, including a dedicated integrated circuit, a dedicated CPU, a dedicated memory, a dedicated component, and the like. Usually, all functions completed by a computer program may be easily implemented by using corresponding hardware, and a specific hardware structure used to implement a same function may also be of various forms, for example, in a form of an analog circuit, a digital circuit, or a dedicated circuit. However, in this application, a software program implementation is a better implementation in most cases. Based on such an understanding, the technical solutions of this application essentially or the part contributing to the current technology may be implemented in a form of a software product. A computer software product is stored in a readable storage medium, such as a floppy disk, a USB flash drive, a removable hard disk, a read-only memory (ROM), a random access memory (RAM), a magnetic disk, or an optical disc of a computer, and includes several instructions for instructing a computer device (which may be a personal computer, a server, a communications apparatus, or the like) to perform the methods in the embodiments of this application.

All or some of the foregoing embodiments may be implemented by using software, hardware, firmware, or any combination thereof. When software is used for implementation, all or some of the embodiments may be implemented in a form of a computer program product.

The computer program product includes one or more computer instructions. When the computer program instructions are loaded and executed on the computer, the procedure or functions in the embodiments of the present disclosure are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium is any usable medium that can be stored by a computer, or a data storage device, such as a server or a data center, integrating one or more usable media. The usable medium is a magnetic medium (for example, a floppy disk, a hard disk, or a magnetic tape), an optical medium (for example, a DVD), a semiconductor medium (fir example, a solid-state drive Solid State Disk (SSD)), or the like.

A person of ordinary skill in the art may understand that all or some of the steps of the methods in the embodiments may be implemented by a program instructing related hardware. The program may be stored in a computer-readable storage medium. The storage medium may include a ROM, a RAM, a magnetic disk, an optical disc, or the like.

The foregoing describes in detail the mapping method, the node, the communications apparatus, and the storage medium provided in the embodiments of the present disclosure. In this specification, specific examples are used to describe the principle and implementations of the present disclosure, and the descriptions of the embodiments are only intended to help understand the method and core idea of the present disclosure. In addition, a person of ordinary skill in the art may make modifications to the specific implementations and the application scope based on the idea of the present disclosure. Therefore, the content of this specification shall not be construed as a limitation to the present disclosure.

What is claimed is:

1. A communication apparatus, which is an integrated access and backhaul node or an apparatus applicable in the integrated access and backhaul node, the communication apparatus comprising:
    at least one processor; and
    one or more memories coupled to the at least one processor and storing programming instructions for execution by the at least one processor to perform operations comprising:
        determining a message type of an uplink signaling message, the integrated access and backhaul node being an access node of a terminal device, wherein the message type comprises: a UE-associated F1 interface application protocol (F1AP) message or a non-UE-associated F1AP message;
        mapping, according to an uplink mapping relationship from an integrated access and backhaul donor centralized unit and the message type, the uplink signaling message to a corresponding backhaul radio link control (BH RLC) channel, wherein the uplink mapping relationship is between the message type and the BH RLC channel; and
        sending the uplink signaling message to a parent node of the integrated access and backhaul node.

2. The communication apparatus according to claim 1, wherein the determining a message type of an uplink signaling message comprises:
    determining, by an integrated access and backhaul node distributed unit, the message type of the uplink signaling message; and
    wherein the mapping, according to an uplink mapping relationship from an integrated access and backhaul donor centralized unit and the message type, the uplink signaling message to a corresponding BH RLC channel comprises:
        determining, by the integrated access and backhaul node distributed unit according to the uplink mapping relationship from the integrated access and backhaul donor centralized unit and the message type, an identifier of a BH RLC channel corresponding to the uplink signaling message;
        sending, by the integrated access and backhaul node distributed unit, the identifier of the BH RLC channel to an integrated access and backhaul node mobile terminal unit; and
        mapping, by the integrated access and backhaul node mobile terminal unit according to the identifier of the BH RLC channel, the uplink signaling message to the BH RLC channel.

3. The communication apparatus according to claim 1, wherein the determining a message type of an uplink signaling message comprises:
    determining, by an integrated access and backhaul node distributed unit, the message type of the uplink signaling message;
    sending, by the integrated access and backhaul node distributed unit, indication information to an integrated access and backhaul node mobile terminal unit, the indication information indicating the message type; and
    wherein the mapping, according to an uplink mapping relationship from an integrated access and backhaul donor centralized unit and the message type, the uplink signaling message to a corresponding backhaul radio link control (BH RLC) channel comprises:
        determining, by the integrated access and backhaul node mobile terminal unit according to the message type and the uplink mapping relationship, an identifier of a BH RLC channel corresponding to the uplink signaling message; and
        mapping, by the integrated access and backhaul node mobile terminal unit, the uplink signaling message to the BH RLC channel.

4. A communication apparatus, which is an integrated access and backhaul donor centralized unit or an apparatus applicable in the integrated access and backhaul donor centralized unit, comprising:
    at least one processor; and
    one or more memories coupled to the at least one processor and storing programming instructions for execution by the at least one processor to:
        send indication information indicating an uplink mapping relationship between a message type of an uplink signaling message and a backhaul radio link control (BH RLC) channel to an integrated access and backhaul node, wherein the message type comprises: a UE-associated F1 interface application protocol (F1AP) message or a non-UE-associated F1AP message.

5. A communication system comprising an integrated access and backhaul node and an integrated access and backhaul donor centralized unit;
    wherein the integrated access and backhaul donor centralized unit comprises:
        at least one processor; and
        one or more memories storing programming instructions executable by the at least one processor to perform first one or more operations comprising:
            sending indication information indicating an uplink mapping relationship between a message type of an uplink signaling message and a backhaul radio link control (BH RLC) channel to an integrated access and backhaul node, wherein the message type comprises: a UE-associated F1 interface application protocol (F1AP) message or a non-UE-associated F1AP message;
wherein the integrated access and backhaul node comprises:
at least one processor; and
one or more memories storing programming instructions executable by the at least one processor to perform second one or more operations comprising:
determining a message type of an uplink signaling message, the integrated access and backhaul node being an access node of a terminal device;
mapping, according to the uplink mapping relationship and the message type, the uplink signaling message to a corresponding backhaul radio link control (BH RLC) channel; and
sending the uplink signaling message to a parent node of the integrated access and backhaul node.

6. The communication system according to claim 5, wherein the determining a message type of an uplink signaling message comprises:
determining, by an integrated access and backhaul node distributed unit, the message type of the uplink signaling message; and
wherein the mapping, according to the uplink mapping relationship and the message type, the uplink signaling message to a corresponding backhaul radio link control (BH RLC) channel comprises:
determining, by the integrated access and backhaul node distributed unit according to the uplink mapping relationship and the message type, an identifier of a BH RLC channel corresponding to the uplink signaling message;
sending, by the integrated access and backhaul node distributed unit, the identifier of the BH RLC channel to an integrated access and backhaul node mobile terminal unit; and
mapping, by the integrated access and backhaul node mobile terminal unit according to the identifier of the BH RLC channel, the uplink signaling message to the BH RLC channel.

7. The communication system according to claim 5, wherein the determining a message type of an uplink signaling message comprises:
determining, by an integrated access and backhaul node distributed unit, the message type of the uplink signaling message; and
sending, by the integrated access and backhaul node distributed unit, indication information to an integrated access and backhaul node mobile terminal unit, the indication information indicating the message type; and
wherein the mapping, according to the uplink mapping relationship and the message type, the uplink signaling message to a corresponding backhaul radio link control (BH RLC) channel comprises:
determining, by an integrated access and backhaul node mobile terminal unit according to the uplink mapping relationship and the message type, an identifier of a BH RLC channel corresponding to the uplink signaling message; and
mapping, by the integrated access and backhaul node mobile terminal unit, the uplink signaling message to the BH RLC channel.

8. A non-transitory computer-readable storage medium comprising instructions which, when executed by a computer, cause the computer to perform operations comprising:
determining a message type of an uplink signaling message received by an integrated access and backhaul node, the integrated access and backhaul node being an access node of a terminal device, wherein the message type comprises: a UE-associated F1 interface application protocol (F1AP) message or a non-UE-associated F1AP message;
mapping, according to an uplink mapping relationship from an integrated access and backhaul donor centralized unit and the message type, the uplink signaling message to a corresponding backhaul radio link control (BH RLC) channel, wherein the uplink mapping relationship is between the message type and the BH RLC channel; and
sending the uplink signaling message to a parent node of the integrated access and backhaul node.

9. The storage medium according to claim 8, wherein the determining a message type of an uplink signaling message comprises:
determining, by an integrated access and backhaul node distributed unit, the message type of the uplink signaling message; and
wherein the mapping, according to an uplink mapping relationship from an integrated access and backhaul donor centralized unit and the message type, the uplink signaling message to a corresponding BH RLC channel comprises:
determining, by the integrated access and backhaul node distributed unit according to the uplink mapping relationship from the integrated access and backhaul donor centralized unit and the message type, an identifier of a BH RLC channel corresponding to the uplink signaling message;
sending, by the integrated access and backhaul node distributed unit, the identifier of the BH RLC channel to an integrated access and backhaul node mobile terminal unit; and
mapping, by the integrated access and backhaul node mobile terminal unit according to the identifier of the BH RLC channel, the uplink signaling message to the BH RLC channel.

10. The storage medium according to claim 8, wherein the determining a message type of an uplink signaling message comprises:
determining, by an integrated access and backhaul node distributed unit, the message type of the uplink signaling message;
sending, by the integrated access and backhaul node distributed unit, indication information to an integrated access and backhaul node mobile terminal unit, the indication information indicating the message type; and
wherein the mapping, according to an uplink mapping relationship from an integrated access and backhaul donor centralized unit and the message type, the uplink signaling message to a corresponding backhaul radio link control (BH RLC) channel comprises:
determining, by the integrated access and backhaul node mobile terminal unit according to the message type and the uplink mapping relationship, an identifier of a BH RLC channel corresponding to the uplink signaling message; and
mapping, by the integrated access and backhaul node mobile terminal unit, the uplink signaling message to the BH RLC channel.

* * * * *